(12) United States Patent
Arai et al.

(10) Patent No.: US 6,747,844 B1
(45) Date of Patent: Jun. 8, 2004

(54) DISK DRIVE

(75) Inventors: Isao Arai, Nishitokyo (JP); Yoshiyuki Ohishi, Nishitokyo (JP); Takuro Kohyama, Nishitokyo (JP); Shigeru Obata, Nishitokyo (JP)

(73) Assignee: Citizen Watch Company, Ltd., Tokyo (JP)

( * ) Notice: Subject to any disclaimer, the term of this patent is extended or adjusted under 35 U.S.C. 154(b) by 0 days.

(21) Appl. No.: 09/831,872

(22) PCT Filed: Sep. 18, 2000

(86) PCT No.: PCT/JP00/06343

§ 371 (c)(1),
(2), (4) Date: Jun. 29, 2001

(87) PCT Pub. No.: WO01/20608

PCT Pub. Date: Mar. 22, 2001

(30) Foreign Application Priority Data

| Sep. 16, 1999 | (JP) | 11-261965 |
| Sep. 16, 1999 | (JP) | 11-261966 |
| Sep. 29, 1999 | (JP) | 11-275872 |
| Oct. 4, 1999 | (JP) | 11-282448 |
| Oct. 4, 1999 | (JP) | 11-282667 |
| Oct. 8, 1999 | (JP) | 11-288064 |
| Oct. 8, 1999 | (JP) | 11-288137 |
| Nov. 24, 1999 | (JP) | 11-333516 |
| Nov. 24, 1999 | (JP) | 11-333517 |
| Nov. 24, 1999 | (JP) | 11-333518 |
| May 1, 2000 | (JP) | 2000-133036 |

(51) Int. Cl.$^7$ .................................. G11B 21/20
(52) U.S. Cl. .................... 360/234.2; 360/254.1
(58) Field of Search .................................. 360/234.2

(56) References Cited

U.S. PATENT DOCUMENTS

| 5,222,005 A | 6/1993 | Inoue |
| 5,291,361 A | 3/1994 | Yokota |
| 5,552,948 A | 9/1996 | Yokota et al. |
| 5,703,857 A | 12/1997 | Davis et al. |
| 6,313,968 B1 * | 11/2001 | Kabasawa ............... 360/99.06 |
| 6,320,724 B1 * | 11/2001 | Suzuki ................... 360/99.02 |

FOREIGN PATENT DOCUMENTS

| EP | 0 353 566 | 2/1990 |
| JP | 7-029338 | 1/1995 |
| JP | 7-078397 | 3/1995 |
| JP | 7-334906 | 12/1995 |
| JP | 8-263955 | 10/1996 |
| WO | WO 96 16403 | 5/1996 |

* cited by examiner

*Primary Examiner*—A. J. Heinz
*Assistant Examiner*—Mark Blouin
(74) *Attorney, Agent, or Firm*—Smith, Gambrell & Russell, LLP

(57) ABSTRACT

If a floppy disk (200) is inserted into a disk drive unit, a link member (52) rotates due to the movement of the floppy disk (200), and a slide piece (61) recedes from under a projecting piece (131) of an upper head support arm (121). In consequence, the distal end of the upper head support arm (121) descends, so that an upper head which is mounted on the distal end of the upper head support arm approaches a lower head which is mounted on the distal end of a lower head support arm.

7 Claims, 37 Drawing Sheets

F I G. 14
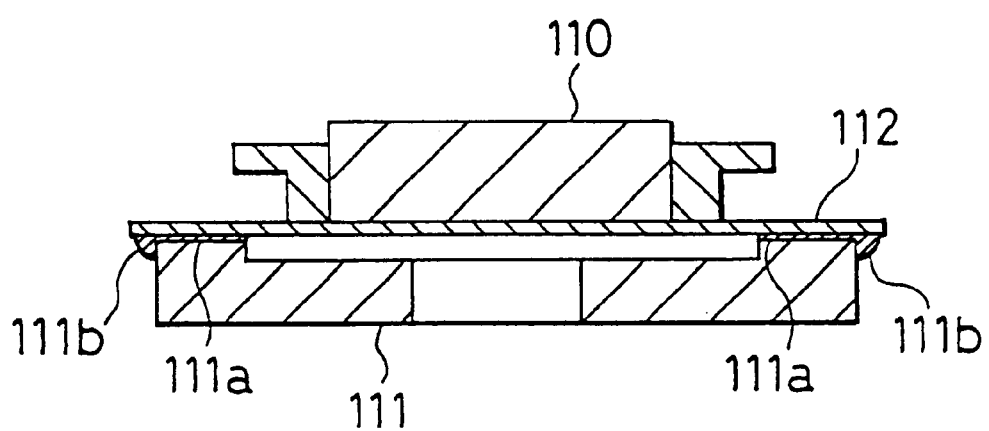

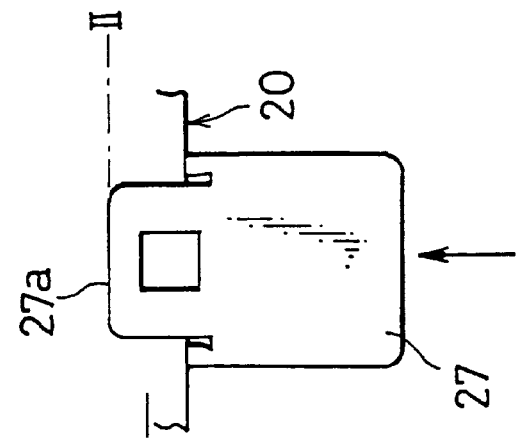
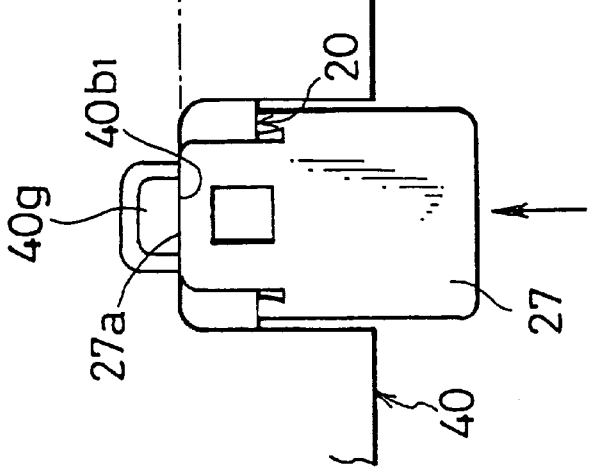
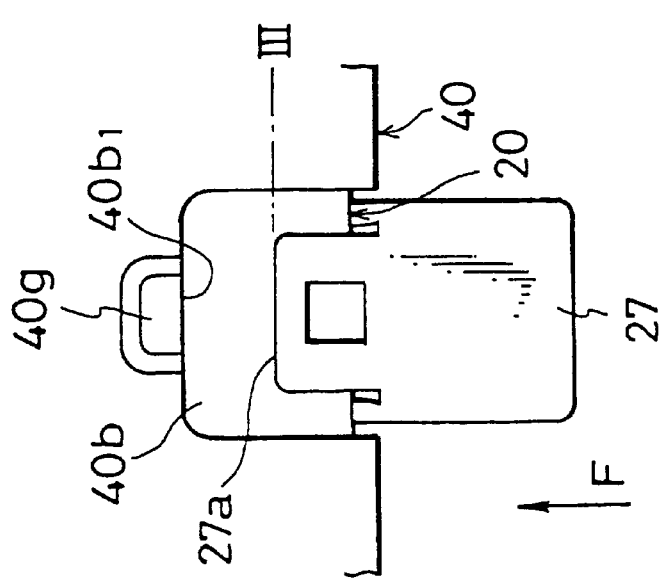

DISK DRIVE

TECHNICAL FIELD

The present invention relates to a disk drive unit in which a cartridge stored with a disk-shaped magnetic record medium, such as a floppy disk, is received, a magnetic recording head is brought into contact with the magnetic record medium as the magnetic record medium is rotated, whereby data are recorded in the magnetic record medium and reproduced from the magnetic record medium.

BACKGROUND ART

A disk drive unit for a floppy disk is designed so that a shutter of the floppy disk (disk cartridge) opens to expose a part of a magnetic record medium therein when the floppy disk is inserted and positioned at a loaded position. An upper magnetic head and a lower magnetic head come into contact with the upper and lower surfaces, respectively, of the exposed disk, thereby recording data in the disk and reproducing data from the disk. When the disk drive unit is not loaded with the floppy disk, the upper magnetic head is situated at a distance from the lower magnetic head.

Many of upper and lower magnetic heads are formed using ceramic materials. If the disk drive unit is subjected to vibration or shock when it is not loaded with any disk cartridge, the upper magnetic head and the lower magnetic head come heavily into contact with each other, whereupon the heads are damaged.

Accordingly, a mechanism (magnetic head lift mechanism) designed in the following manner is used. When the disk cartridge is not inserted in the disk drive unit, that is, when the upper magnetic head is separated from the lower magnetic head, the mechanism fixes this separated state to prevent the upper magnetic head and the lower magnetic head from running against each other if they are subjected to vibration or shock. When the floppy disk is inserted, on the other hand, the mechanism releases the upper magnetic head and the lower magnetic head from the fixedly separated state.

Since magnetic head lift mechanisms having so far been proposed are complicated in construction, they cannot be easily stored in a narrow space in the disk drive unit. Therefore, they cannot satisfactorily meet the demand for thinner, smaller disk drive units without ruining appropriate strength against shock.

In a magnetic head lift mechanism described in Japanese Patent Application Laid-Open No. 9-17137, as shown in FIGS. 37A and 37B, a lifter 351 for supporting an upper magnetic head 321 off a lower magnetic head is provided on the upper surface of a cartridge holder 303 (carrier) that carries a disk cartridge 309 thereon, the lifter 351 being in engagement with an upper magnetic head support member 341 which is fitted with the upper magnetic head 321. When the cartridge holder 303 moves up and down as the cartridge 309 is loaded and unloaded, the lifter 351 rocks so that its distal end moves up and down.

This lift mechanism is provided with shock preventing means that serves to prevent the lifter 351 from descending if it is subjected to vibration or shock. One of the shock preventing means is an extending portion 322 of a shutter lever 312 which is inserted below the lifter 351, and another is a holder guard 307 that serves to prevent the cartridge holder 303, which is fitted with the shutter lever 312 and the lifter 351, from sinking, as shown in FIGS. 38A and 38B.

The holder guard 307 is formed of a springy member. When the cartridge 309 is inserted into a disk drive unit, the holder guard 307 is pushed to be displaced by the cartridge 309, thereby allowing the cartridge holder 303 to descend. When the disk drive unit is not loaded with the cartridge 309, on the other hand, the holder guard 307 is returned to its original position by its elasticity, and its receiving portion 378 prevents the cartridge holder 303 from descending.

According to the magnetic head lift mechanism described above, the lifter 351 is provided on the upper surface of the cartridge holder 303, and the lifter 351 is rocked up and down when the cartridge holder 303 moves up and down as the cartridge 309 is loaded and unloaded, so that there is no need of any special drive unit for rocking the lifter 351. However, the range of vertical movement of the cartridge holder 303 slightly varies according to products under the influence of manufacture and assembly, so that it requires fine adjustment in the final stage of the assembly. Actually, in order to adjust the range of vertical movement of the lifter, an adjust screw 312 is used in Japanese Patent Application Laid-Open No. 9-17137.

If the descent of the cartridge holder 303 is prevented by the springy member, as mentioned before, however, the prevention is easily canceled by vibration or shock, and fine adjustment operation by the adjust screw in the final stage of the assembly, if necessary, requires so much labor.

DISCLOSURE OF THE INVENTION

The object of the present invention is to provide a disk drive unit provided with a magnetic head lift mechanism of a simple construction, which is highly resistant to vibration and shock and sturdy.

In order to achieve the above object, a disk drive unit according to the present invention comprises a first arm and a second arm fitted with a first magnetic head and a second magnetic head, respectively, and capable of moving toward and away from each other, arm urging means urging the first and second arms to move toward each other, and a slide piece capable of moving toward the first and second arms from beside the first and second arms and engaging at least one of the arms, thereby maintaining the distance between the first and second arms. When the slide piece retreats to a position where it engages neither of the first nor second arms, the first and second arms are moved toward each other by the arm urging means.

In the disk drive unit according to the present invention, the slide piece slides toward the arms from beside the arms and engage the arms, thereby supporting the arms from below. Thus, the arms can be supported securely, and there is no possibility of the slide piece being disengaged from the arms if it is subjected to vibration or shock.

BRIEF DESCRIPTION OF THE DRAWINGS

FIG. 14 is a sectional view of the lower head support member fitted with the lower magnetic head, taken along line X—X of FIG. 13;

FIGS. 30A to 30C are views for illustrating a first example of the way of regulating the movement of the slider by an eject button of the slider and a notched recess formed in the cover;

BEST MODE FOR CARRYING OUT THE INVENTION

[Outline of Disc Drive Unit]

Figure 1:
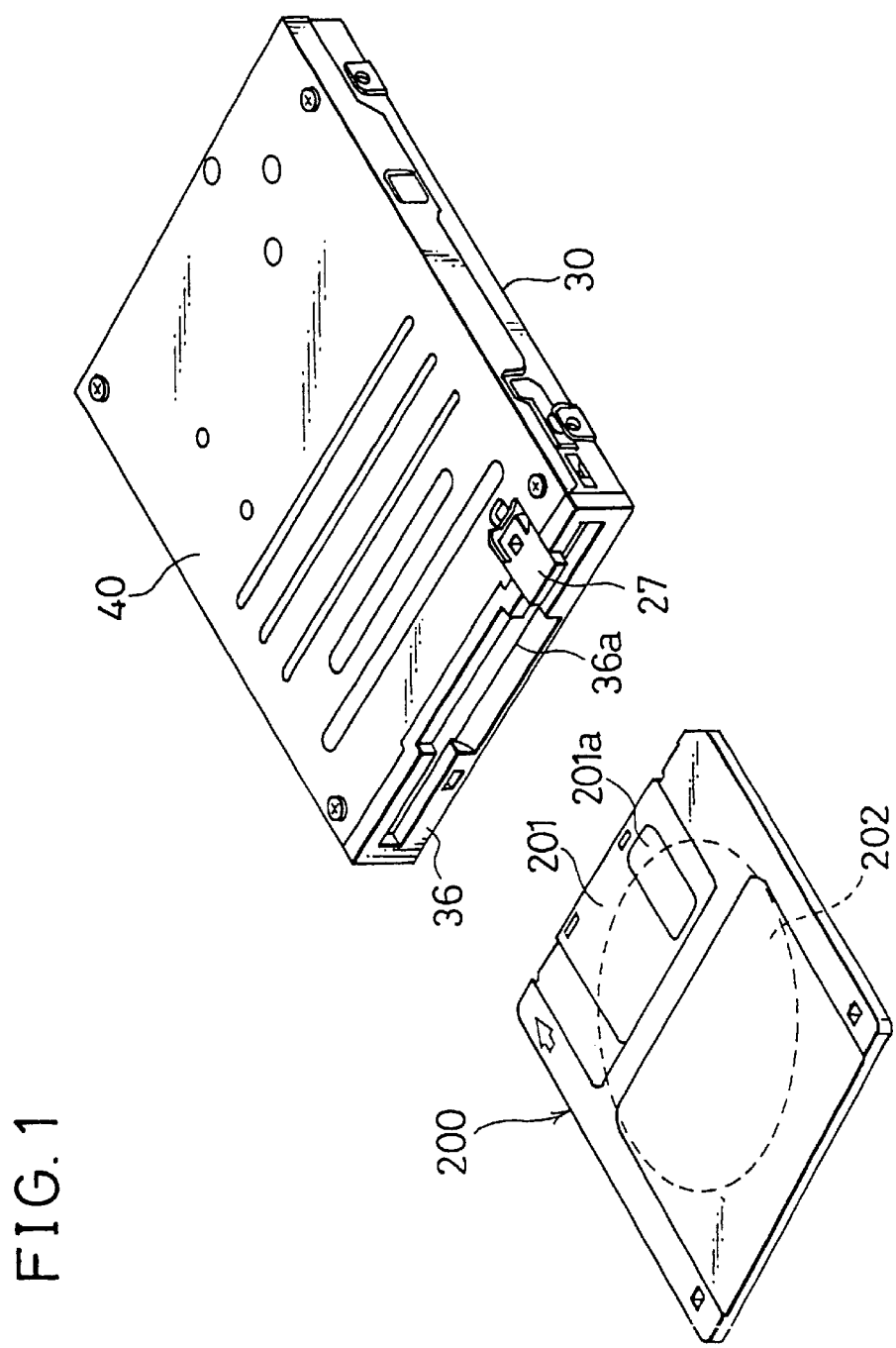
FIG. 1 is a perspective view showing an external appearance of disk drive unit according to one embodiment of the present invention.

FIG. 1 shows an external appearance of a disk drive unit according to the present invention. When a disk cartridge (floppy disk 200) is inserted through a loading slot 36a in a front bezel of the disk drive unit and located in a loaded position, a magnetic record medium (hereinafter referred to as disk) of the floppy disk 200 is rotated by a disk drive motor in the disk drive unit, and information is read from or written into the disk by a head in the disk drive unit.

Figure 2:
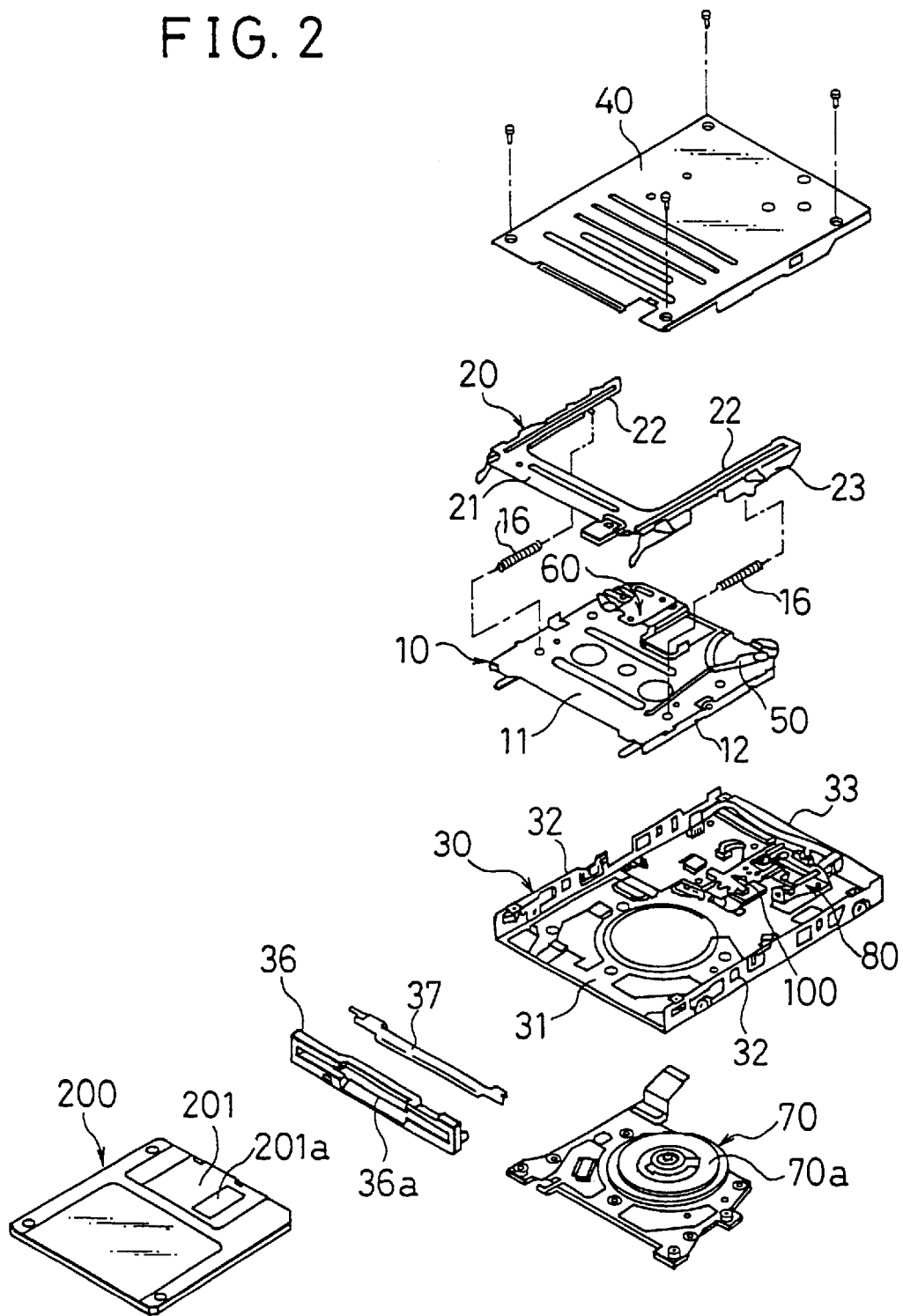
FIG. 2 is an exploded perspective view of the disk drive unit of FIG. 1.

FIG. 2 shows the disk drive unit of FIG. 1 in a disassembled state. As shown in FIG. 2, the disk drive unit is composed of a carrier 10, slider 20, frame 30, and cover 40.

[Outlines of Carrier, Slider, and Frame]

Figure 3:
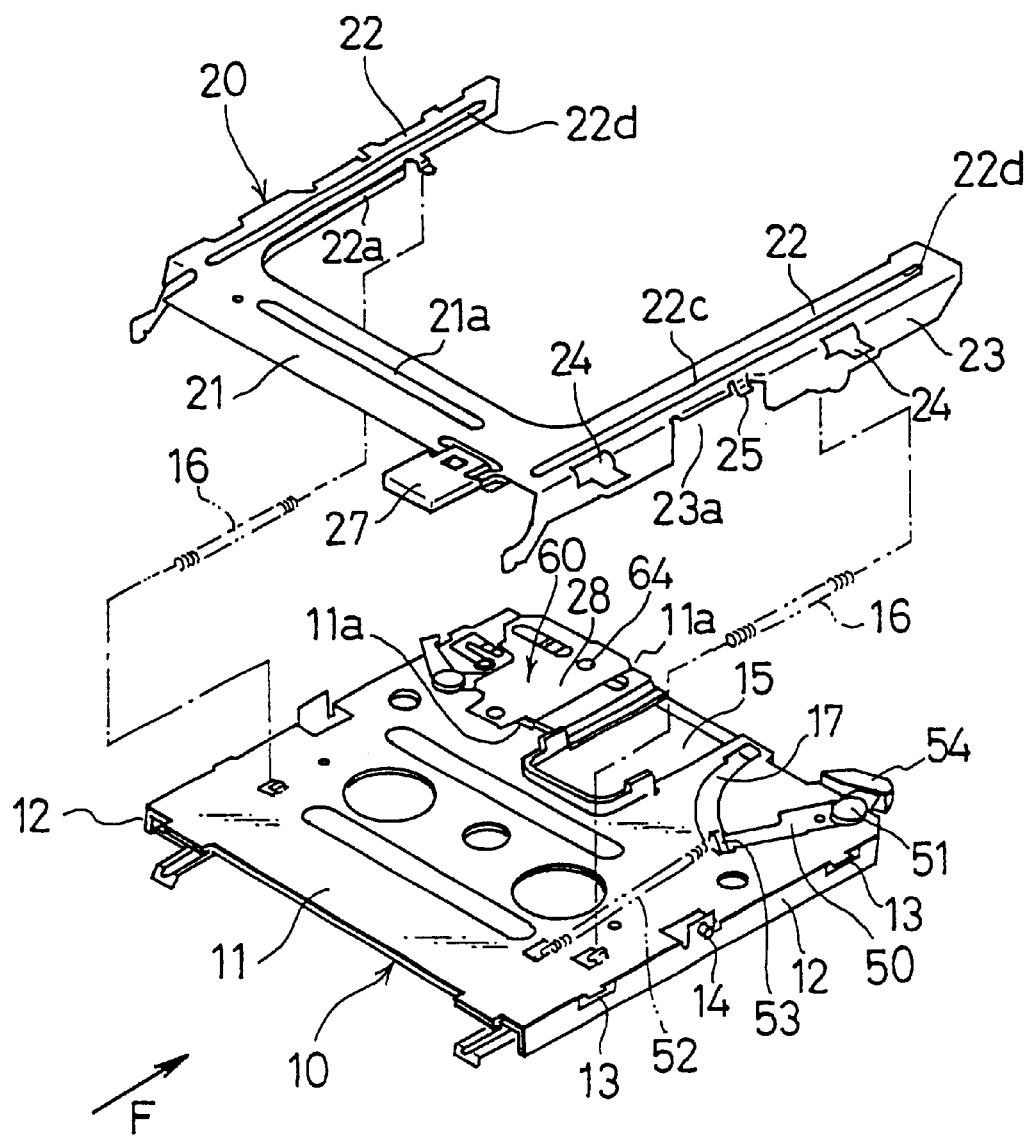
FIG. 3 is an enlarged view showing a carrier and a slider of FIG. 2.

As shown in FIG. 3, the carrier 10 has a shape such that side walls 12, 12 hang at right angles to the plane of a substantially rectangular top plate 11 in the form of a flat plate from the left- and right-hand side edges of the top plate 11, and the respective lower end portions of the side walls 12, 12 are then bent inward in a direction perpendicular to the side walls (i.e., in a direction parallel to the plane of the top plate 11). Thus, channels are formed individually on the opposite sides, left- and right-hand, of the lower surface of the top plate 11. The floppy disk 200 can slide under the top plate 11 of the carrier 10 in a manner such that its opposite sides, left- and right-hand, are fitted individually in the left- and right-hand channels of the carrier 10.

The top plate 11 of the carrier 10 is formed with an opening 15 in the center of its rear end portion (end portion on the side opposite the end portion on the side where the disk cartridge disk is inserted) and a guide hole 17 of an engaging piece 53 (mentioned later) on the right-hand side of the rear end portion. Two engaging projections 13, 13 and one engaging pin are formed on each of the left- and right-hand side walls 12 of the carrier 10.

As shown in FIG. 3, the slider 20 includes a front frame 21 in the form of an elongate plate formed integrally with left- and right-hand side frames 22, 22 in the form of elongate plates that extend backward (or in the floppy disk loading direction indicated by arrow F in FIG. 3) from the left- and right-hand end portions of the front frame 21. Further, the outside portion of each side frame 22 is bent downward and forms a side wall 23. The front frame 21 and the left- and right-hand side frames 22 are on the same plane.

A gutter 21a, recessed on the underside, is formed in the upper surface of the front frame 21 so as to extend in its lengthwise direction, thereby reinforcing the front frame.

The left- and right-hand side walls 23 are formed each having a notch 23a in the central portion with respect to the floppy disk loading direction and slanting guide holes 24, 24 before and behind the notch 23a. Further, an engaging projection 25 projects outward from that portion of each of the left- and right-hand side frames 22 which is situated over the notch 23a.

Figure 4:
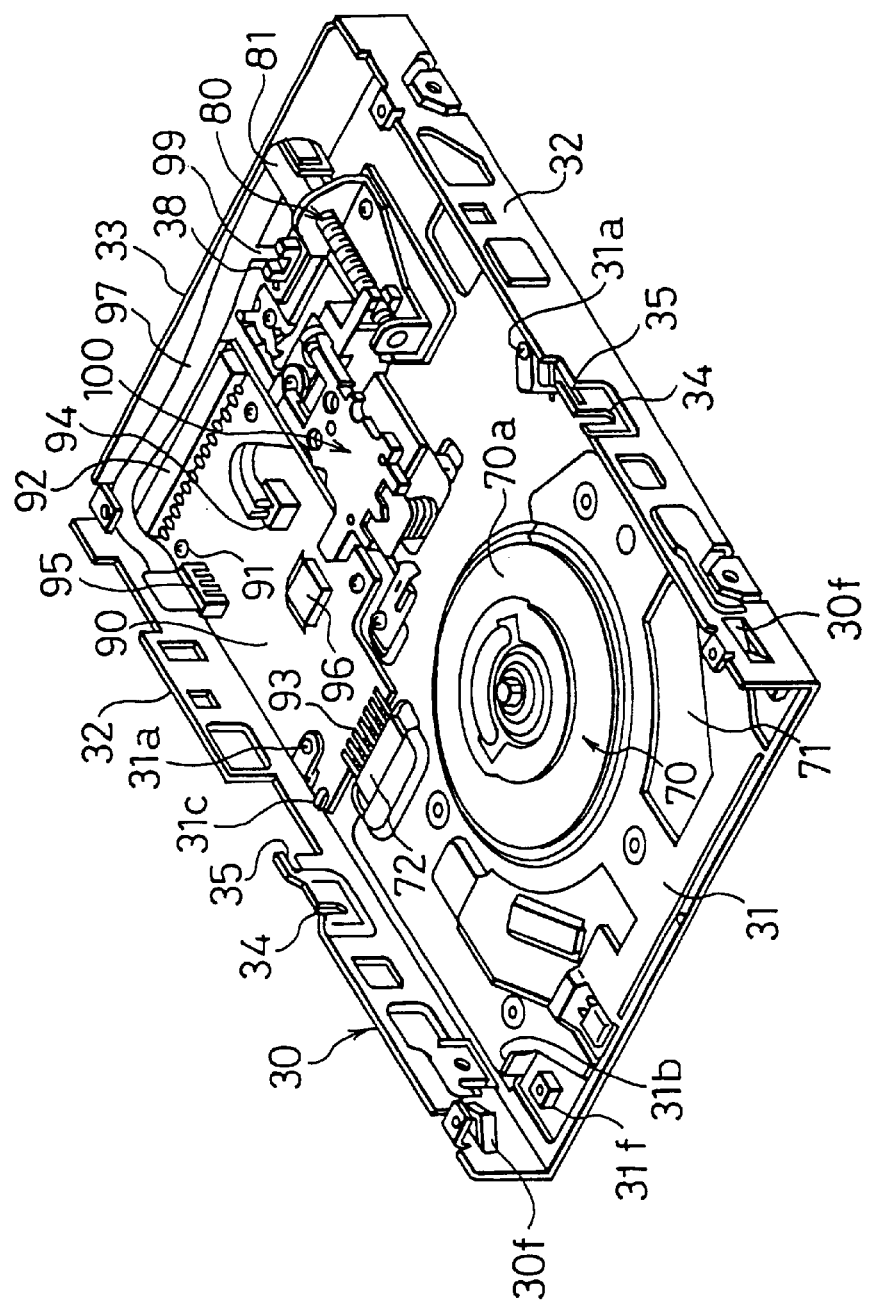
FIG. 4 is a view showing a frame of FIG. 2 and various elements mounted on the frame.

As shown in FIG. 4, the frame 30 has a form such that side walls 32, 32 are raised individually from the left- and right-hand side edges of a base plate 31 in the shape of a rectangular flat plate and a rear wall 33 is raised from the rear end edge of the base plate 31. The left- and right-hand side walls 32, 32 are formed each having a vertical guide slit 34 that extends at right angles to the plane of the base plate 31 and a horizontal slit (support slit 35) that extends in the loading direction for the floppy disk 200.

[Incorporation of Carrier and Slider into Frame 30]

The carrier 10 and the slider 20 are combined and incorporated into the frame 30. The following is a description of this incorporation.

Figure 5:
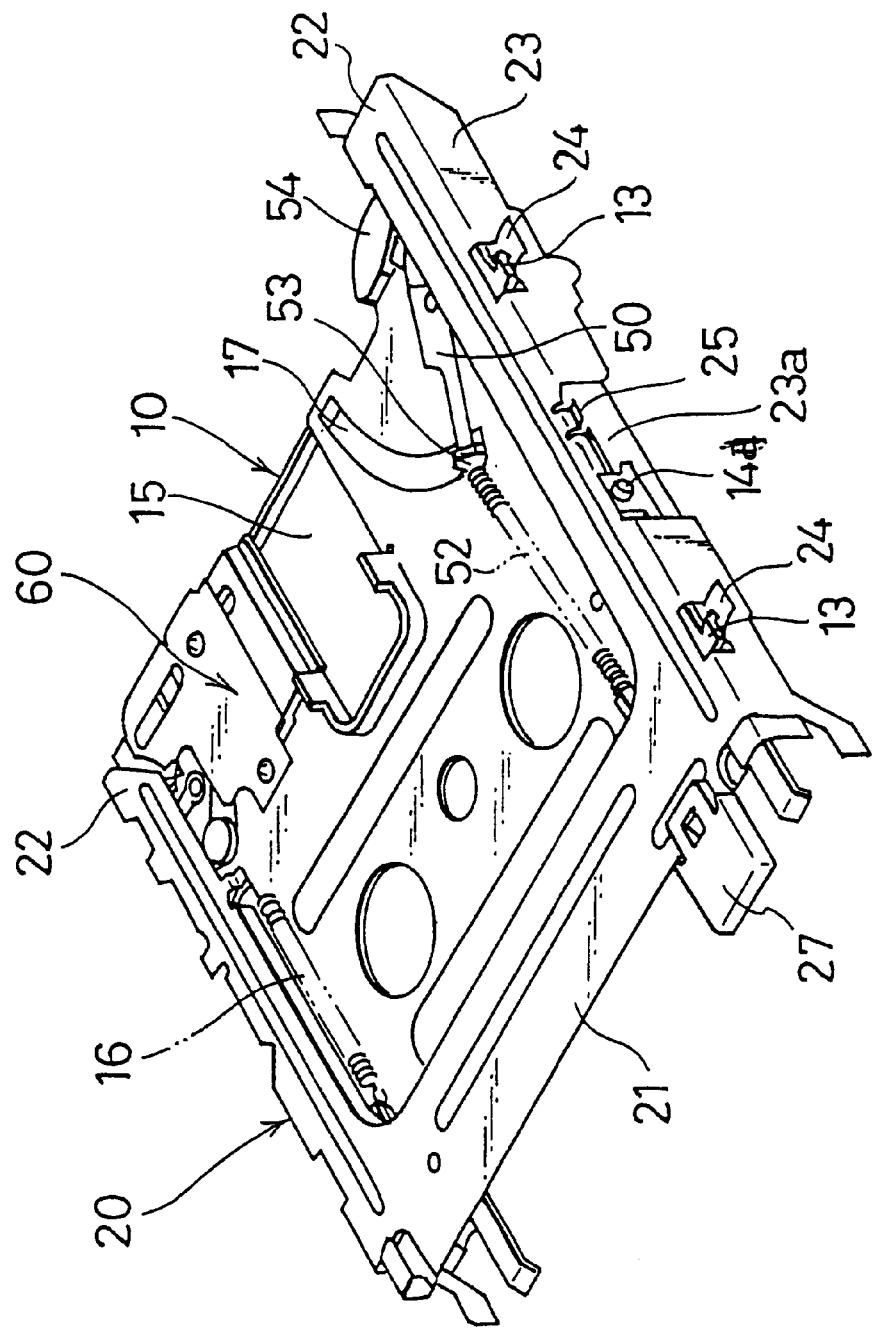
FIG. 5 is a perspective view showing a combination of the carrier and the slider shown in FIG. 3.
Figure 10A:
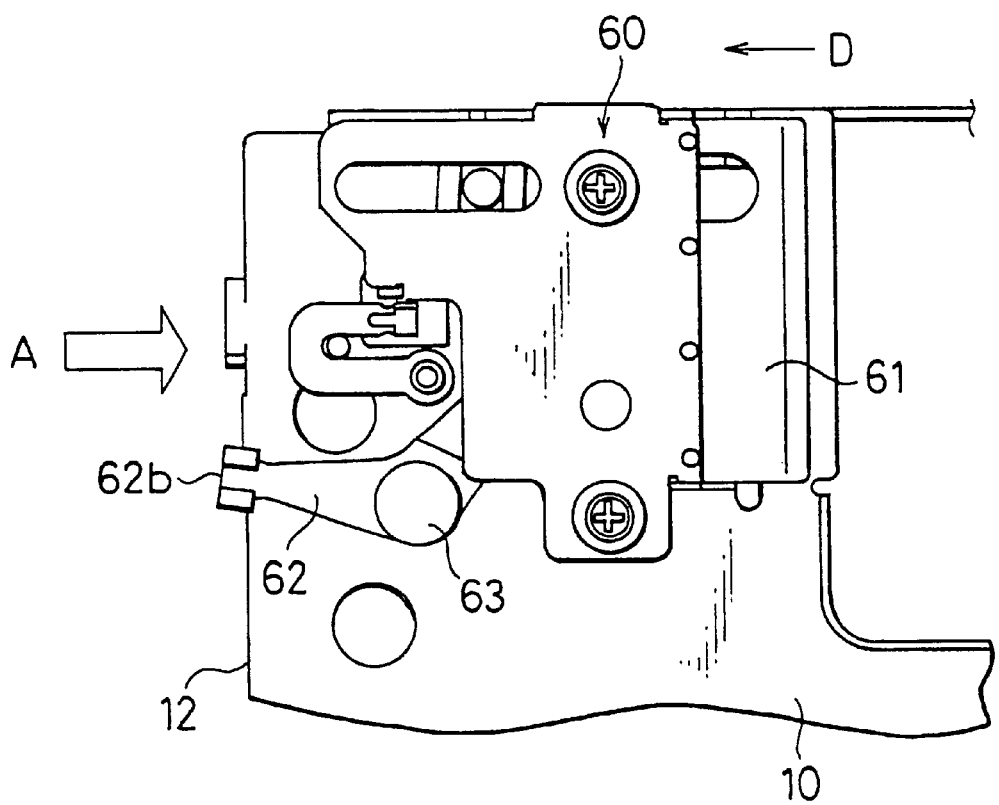
FIG. 10A is a plan view showing an upper magnetic head lift mechanism provided on the carrier.
Figure 10B:
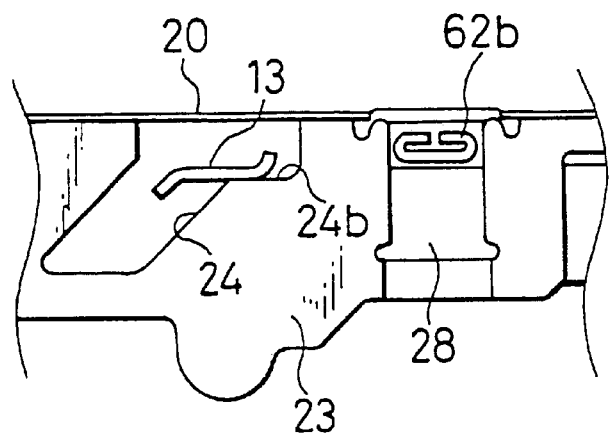
FIG. 10B is a side view taken in the direction of arrow A of FIG. 10A.

When the carrier 10 and the slider 20 are combined, the paired engaging projections 13 of the carrier 10 engage the paired slanting guide holes 24 of the slider 20, individually, as shown in FIGS. 5 and 10B. Thus, the carrier 10 moves obliquely with respect to the slider (in a direction which is obtained by synthesizing a longitudinal direction parallel to the plane of the top plate 11 of the carrier 10 and a direction perpendicular to the plane of the top plate 11) along the direction of inclination of the slanting guide holes 24. The engaging pins 14 of the carrier 10 are situated corresponding to the notches 23a that are formed in the slider 20.

Figure 6:
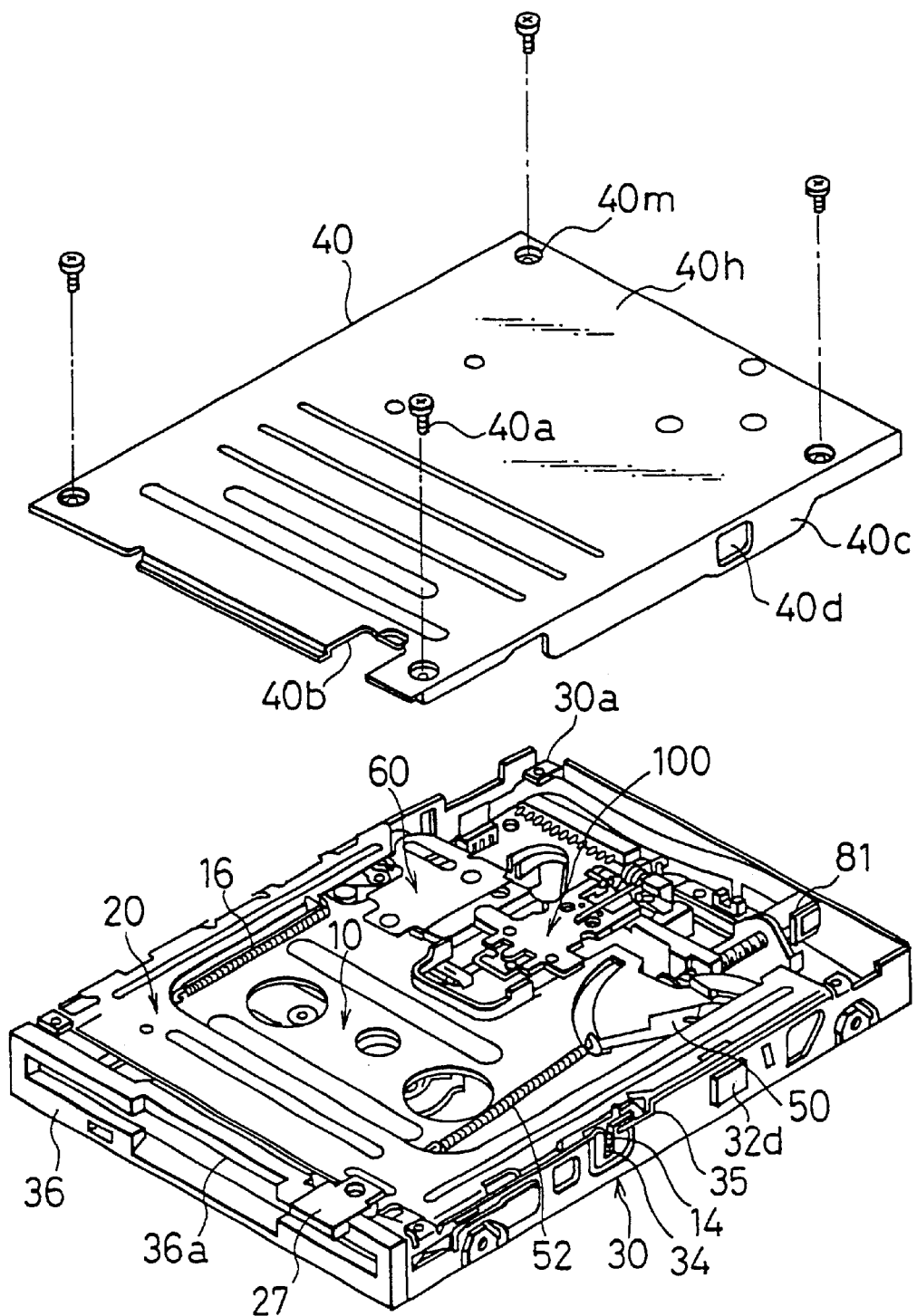
FIG. 6 is a view illustrating the way the disk drive unit of FIG. 1 is assembled by incorporating the combination of the carrier and the slider into the frame and further putting a cover on the frame.
Figure 26A:
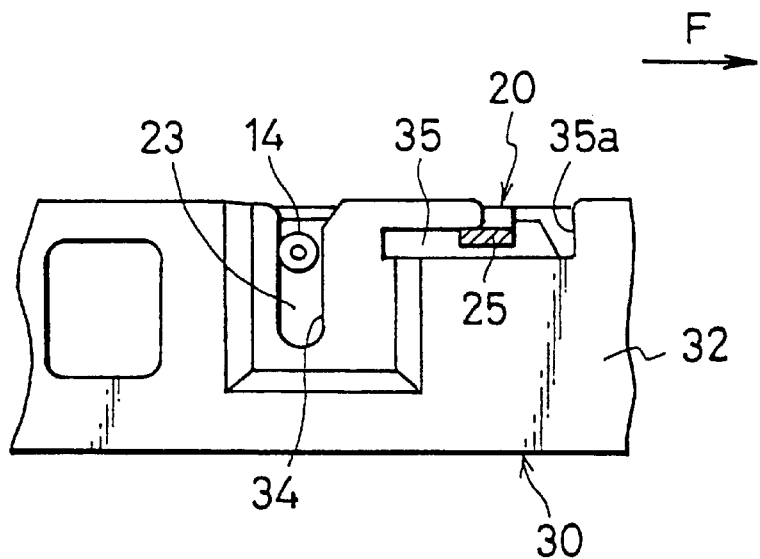
FIGS. 26A to 26C are views for illustrating the way an engaging projection of the slider takes first, second, and third positions in a support slit formed in a side frame of the frame.

When the combination of the carrier 10 and the slider 20 is incorporated into the frame 30, the engaging pins 14 of the carrier 10 pass the notches 23a in the slider 20 and engage the vertical guide slits 34 of the frame 30, individually, as shown in FIGS. 6 and 26A. Further, the engaging projections 25 of the slider 20 engage the support slits 35 of the slider 20, individually.

As the engaging pins 14 and the vertical guide slits 34 engage one another, therefore, the carrier 10 moves only in the vertical direction with respect to the frame 30. As the engaging projections 25 and the support slits 35 engage one another, moreover, the slider 20 moves only in the horizontal direction (direction in which the floppy disk 200 is loaded and unloaded) with respect to the frame 30.

As shown in FIG. 3, furthermore, coil springs 16 are anchored between the top plate 11 of the carrier 10 and the side frames 22 of the slider 20. Thus, the slider 20 is continually urged forward with respect to the carrier 10 by the coil springs 16.

Figure 7:
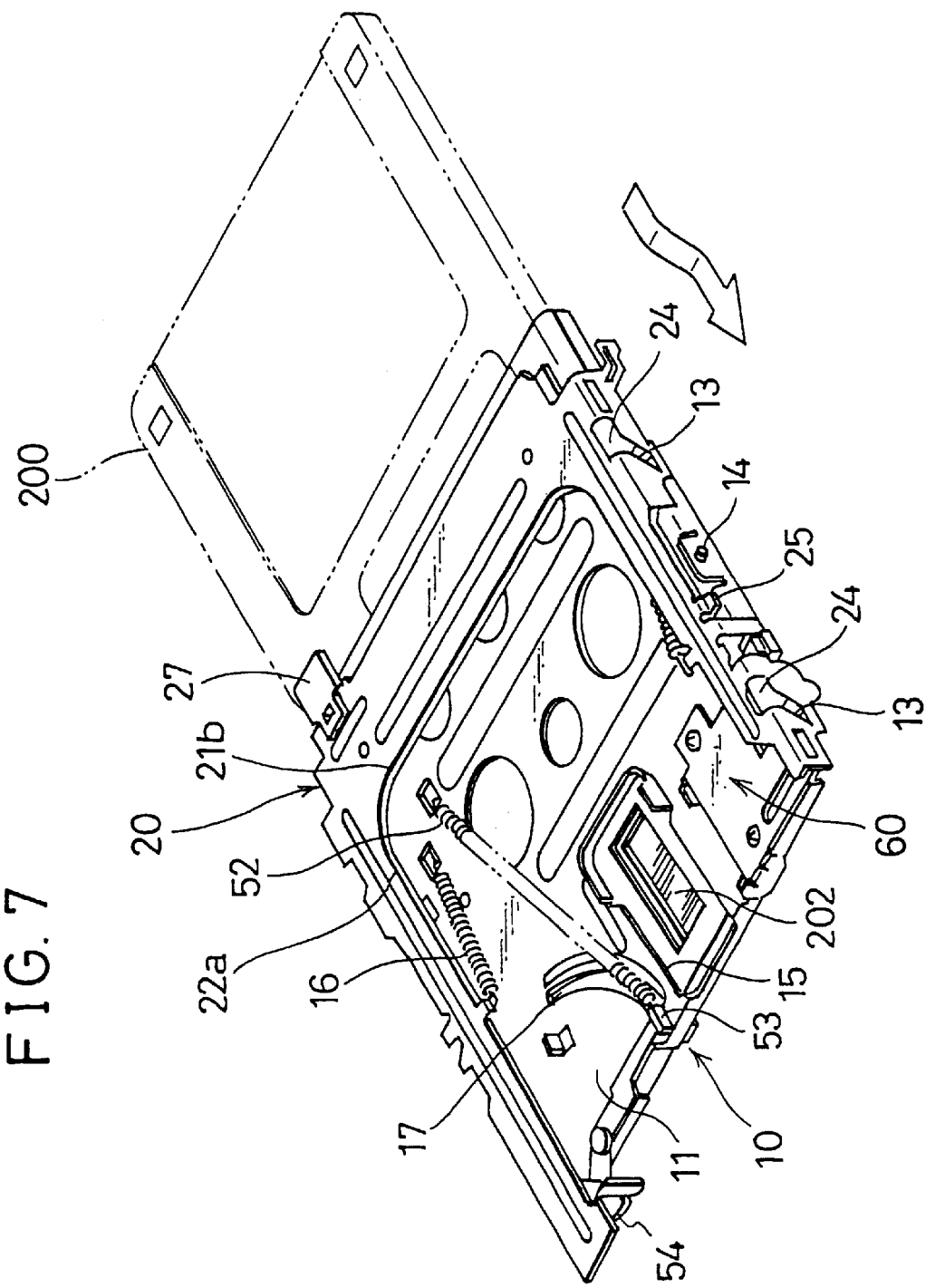
FIG. 7 is a view of the combination of the carrier and the slider taken in a direction different from the direction of FIG. 5.

When the slider 20 and the carrier 10 are combined, a level difference which is equal to the heights of inner side edge portions 21b and 22a of the front frame 21 and the left- and right-hand side frames 22 is formed between the top plate 11 of the carrier 10 and the upper surface of the slider 20 (upper surfaces of the front frame 21 and the left- and right-hand side frames 22), as shown in FIG. 7. Since the coil springs 16 are stored in spaces corresponding to the level difference, the coil springs 16 can avoid interfering with the cover 40.

[Components Mounted on Frame]

The frame 30 is mounted with a disk drive mechanism 70 (composed of a turntable 70a and a disk drive motor located right under it and capable of directly driving the turntable 70a) for rotating a disk 202 (FIG. 1) which is stored in the floppy disk 200, a magnetic head unit 100 for writing data into the disk 202 and reading data from the disk 202, a head drive mechanism 80 for moving the magnetic head unit 100 forward or backward step by step, etc.

As shown in FIG. 2, the disk drive mechanism 70 is removably attached to the front portion of the bottom face 31 of the frame 30 by screws.

When the floppy disk 200 which is inserted in the carrier 10 reaches its loaded position as the carrier 10 moves relatively to the frame 30, the floppy disk 200 engages positioning lugs 31a provided on the respective central portions of the left- and right-hand sides of the base plate 31 of the frame 30, and is supported by support walls 31b on the opposite sides of the front end of the base plate 31 of the frame 30, thereby maintaining a given posture.

Located near the left-hand support wall 31b, as shown in FIG. 4, is a sensor 31f which is used to see if a write-inhibit window of the floppy disk 200 is open. Located near the right-hand support wall 31b is a sensor (not shown) which is used to see if a window for identifying the type of the floppy disk 200, 2DD or 2HD, is open. Located in an intermediate position between the right-hand support wall 31b and the right-hand positioning lug 31a, moreover, is a sensor (not shown) for detecting the presence of the floppy disk 200. Any of these sensors is formed of a microswitch.

The magnetic head unit 100 is provided in the center of the rear portion of the base plate 31 of the frame 30. As shown in FIG. 4, moreover, the head drive mechanism 80 is located on the right-hand side of the magnetic head unit 100, on the base plate 31 of the frame 30, and a control circuit board 90 on the left-hand side.

[Mechanism for Opening and Closing Shutter of Floppy Disk]

As shown in FIG. 3, a switching lever 50 for opening and closing a shutter 201 of the floppy disk 200 is supported by a pivot 51 on the right-hand end of the rear end portion of the top plate 11 of the carrier 10, and rocks around the shaft.

Figure 8:
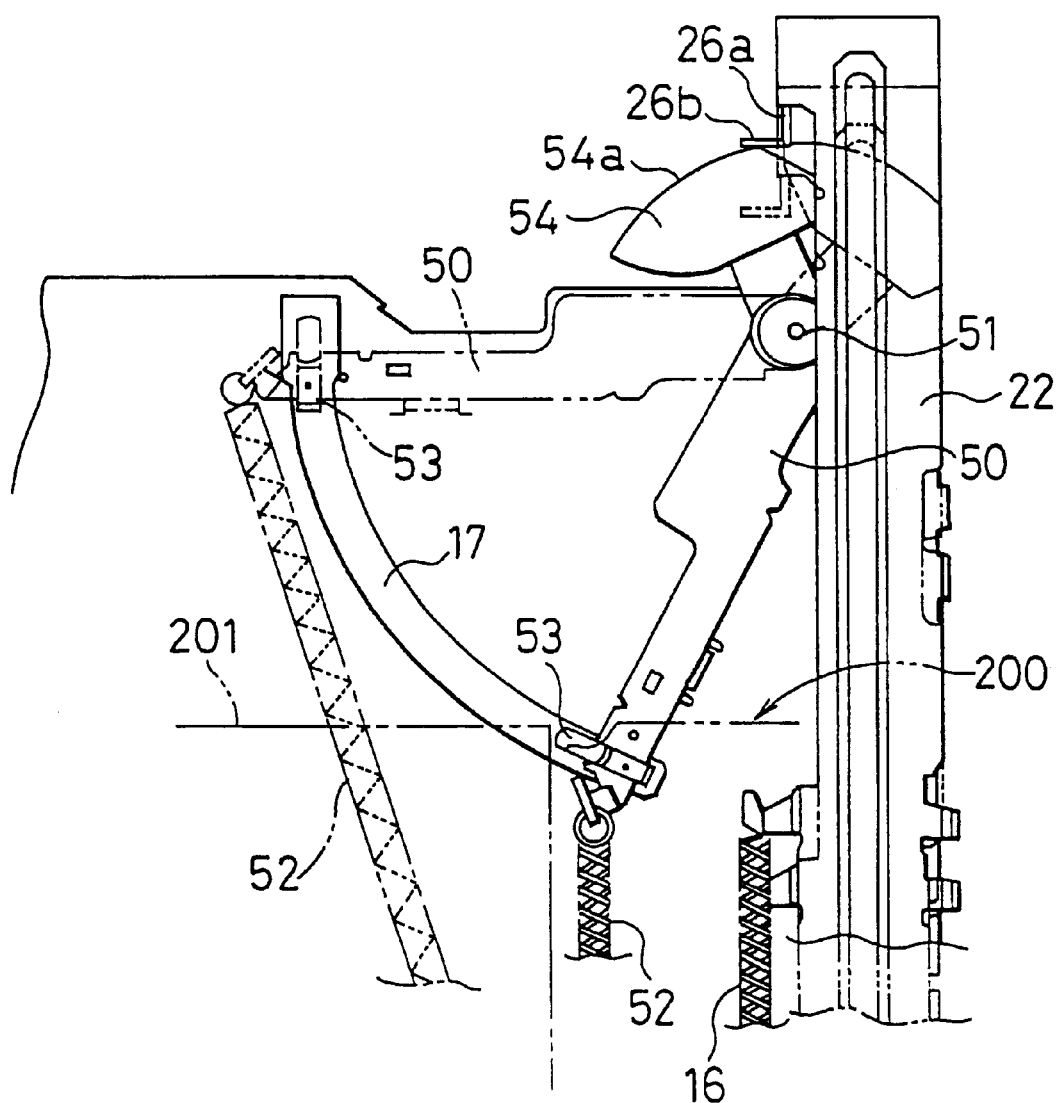
FIG. 8 is a view showing a structure for opening and closing a floppy disk.

As shown in FIG. 8, the engaging piece 53 is provided on one end portion of the switching lever 50. This engaging piece 53 downwardly penetrates the arcuate guide hole 17 formed in the top plate 11 of the carrier 10.

If the floppy disk 200 is inserted into the carrier 10 through its front portion, the engaging piece 53 of the switching lever 50 engages the right-hand end of the shutter 201 of the floppy disk 200 (see the relation between the switching lever 50 represented by full line and the floppy disk 200 represented by imaginary line in FIG. 8). If the floppy disk 200 in this state is further pushed in, the engaging piece is pushed by the floppy disk 200 that moves in the loading direction, whereupon the switching lever 50 rocks clockwise. In this process, the engaging piece 53 of the switching lever 50 moves the shutter 201 of the floppy disk 200 to the left, thereby opening it, and causes a part of the disk 202 of the floppy disk 200 to be exposed. An upper magnetic head 120 can access the upper surface of the exposed disk 202 through the opening 15 of the carrier 10, which will be mentioned later.

A coil spring 52 is stretched between the engaging piece 53 of the switching lever 50 and a projection on the top plate 11, and continually urges the switching lever 50 in the counterclockwise direction over the top plate 11 of the carrier 10.

As shown in FIG. 8, a cam member 54 is provided on the other end portion of the switching lever 50. On the other hand, a first abutting wall 26a and a second abutting wall 26b are formed inside the rear end portion of the right-hand side frame 22 of the slider 20. The first abutting wall 26a has a flat surface that extends parallel to the floppy disk loading direction and at right angles to the plane of the top plate 11 of the carrier 10, while the second abutting wall 26b adjoins the first abutting wall 26a and has a flat surface that extends at right angles to the floppy disk loading direction and also to the plane of the top plate 11 of the carrier 10.

Figure 9:
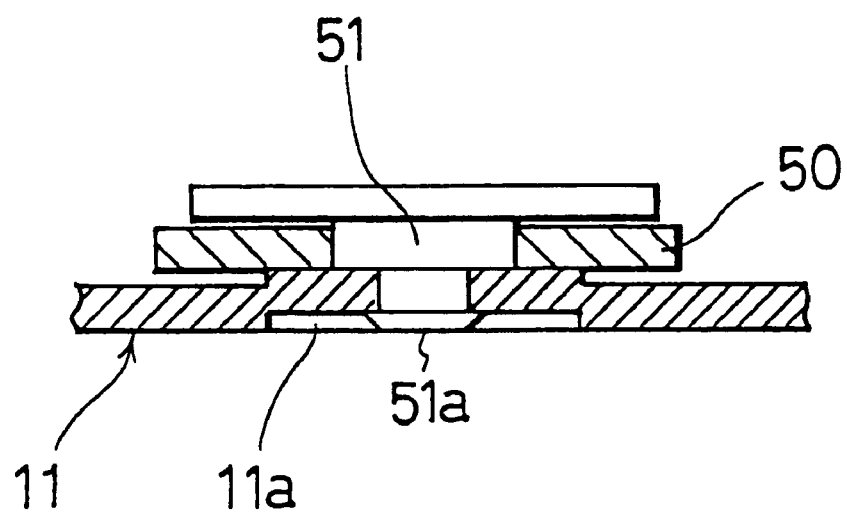
FIG. 9 is a view illustrating the way a pivot supporting a switching lever of FIG. 8 is mounted on the carrier.

As shown in FIG. 9, the pivot 51 that supports the switching lever 50 has its lower end 51a staked to the lower surface of the top plate 11 of the carrier 10. More specifically, a countersunk step portion 11a is formed on the lower surface of the top plate 11, and the caulked end portion 51a of the pivot 51 is held in the countersunk step portion 11a. Since the caulked end portion 51a of the pivot 51 does not project downward from the lower surface of the top plate 11 of the carrier 10, it never interferes with the floppy disk 200 which is inserted under the carrier.

When the floppy disk 200 is not inserted in the carrier 10 (or is inserted only shallowly), the switching lever 50 is located in the position indicated by full line in FIG. 8 by the urging force of the coil spring 52. When the switching lever 50 is in this position, a cam surface 54a provided on the outer periphery of the cam member 54 is in contact with the second abutting wall 26b of the slider 20. Even though the slider 20 is pulled forward with respect to the carrier 10 by the coil springs 16, 16, therefore, the slider 20 is prohibited from moving relatively to the carrier 10 as the cam surface 54a and the second abutting wall 26b engage each other.

In this state, the carrier 10 is held in a position raised with respect to the frame 30 (and the slider 20 held at the same level as the frame 30). Thus, each engaging projection 13 of the carrier 10 is situated not in the slanting guide hole 24 of the slider 20, but in a horizontal guide hole 24b that connects with the upper part of the slanting guide hole 24, as shown in FIG. 10B.

If the floppy disk 200 is inserted into the disk drive unit in this state or if the floppy disk 200 is inserted into the carrier 10, the floppy disk 200 pushes the engaging piece 53 of the switching lever 50 backward, whereupon the switching lever 50 rocks clockwise. If the switching lever 50 is rocked to the position indicated by imaginary line in FIG. 8, the cam member 54 which is fixed to the switching lever 50 rocks to the position indicated by imaginary line in FIG. 8, and the cam surface 54a moves outward from the second abutting wall 26b of the slider 20. In consequence, the cam surface 54a is disengaged from the second abutting wall 26b. Thereupon, the slider 20 is moved forward (in the floppy disk unloading direction) to the position indicated by imaginary line in FIG. 8 with respect to the carrier 10 by the urging force of the coil springs 16, 16.

When the forward movement of the slider 20 relative to the carrier 10 is caused, the carrier 10 descends with respect to the slider 20 as the engaging projections 13, 13 of the carrier 10 and the slanting guide holes 24, 24 of the slider 20 engage one another in the aforesaid manner. Since the carrier 10 descends with the engaging pins 14 of the carrier 10 in engagement with the vertical guide slits 34 of the side walls 32 of the frame 30, however, the carrier 10 descends at right angles to the frame 30. As this is done, each engaging projection 13 of the carrier 10 is placed in the lower part of the slanting guide hole 24 of the slider 20, as shown in FIG. 1B.

In this state, the left-hand portion of the cam member 54 abuts against the first abutting wall 26a of the slider 20 in the imaginary-line position, as indicated by imaginary line in FIG. 8, thereby prohibiting the switching lever 50 from further rocking clockwise from the rocked position indicated by imaginary line in FIG. 8.

As shown in FIG. 3, an eject button 27 is provided on the right-hand portion of the front frame 21 of the slider 20. If the eject button 27 is pushed backward, slider 20 moves in the same direction to reach the full-line position of FIG. 8. In consequence, the cam member 54 and the first abutting wall 26a are disengaged from each other, so that the switching lever 50 is rocked counterclockwise by the urging force of the coil spring 52. As this is done, the engaging piece 53 of the rocking switching lever 50 pushes out the floppy disk 200 in the unloading direction.

[Magnetic Head]

Figure 12A:
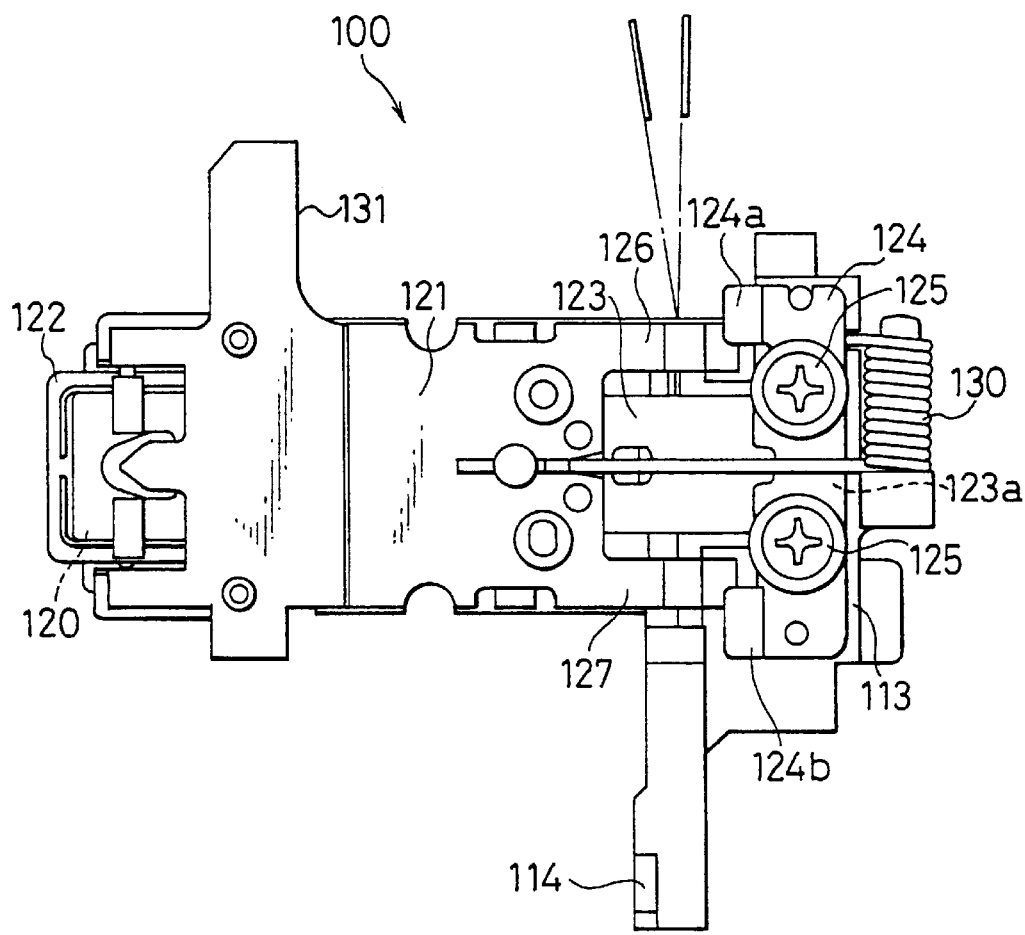
FIG. 12A is a plan view showing a magnetic head unit.
Figure 12B:
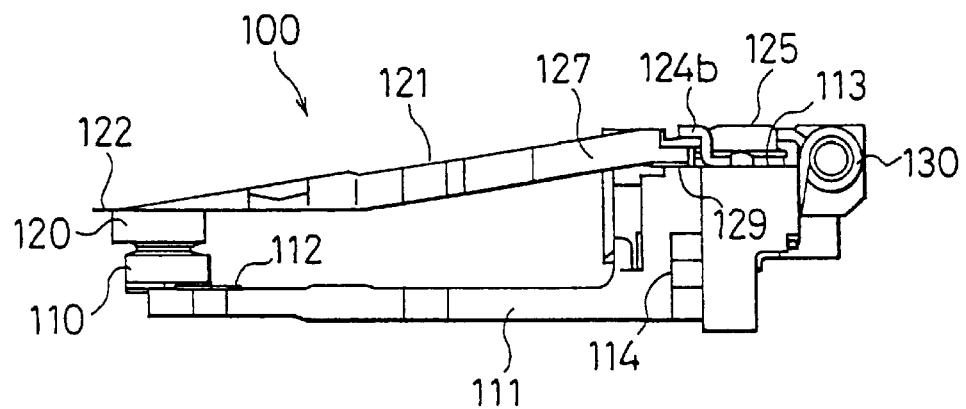
FIG. 12B is a side view of the magnetic head unit.

As shown in FIG. 12B, the magnetic head unit 100 is provided with a lower head support member (carriage) 111 and an upper head support member 121 which extend forward (in the floppy disk unloading direction), respectively.

Figure 13:
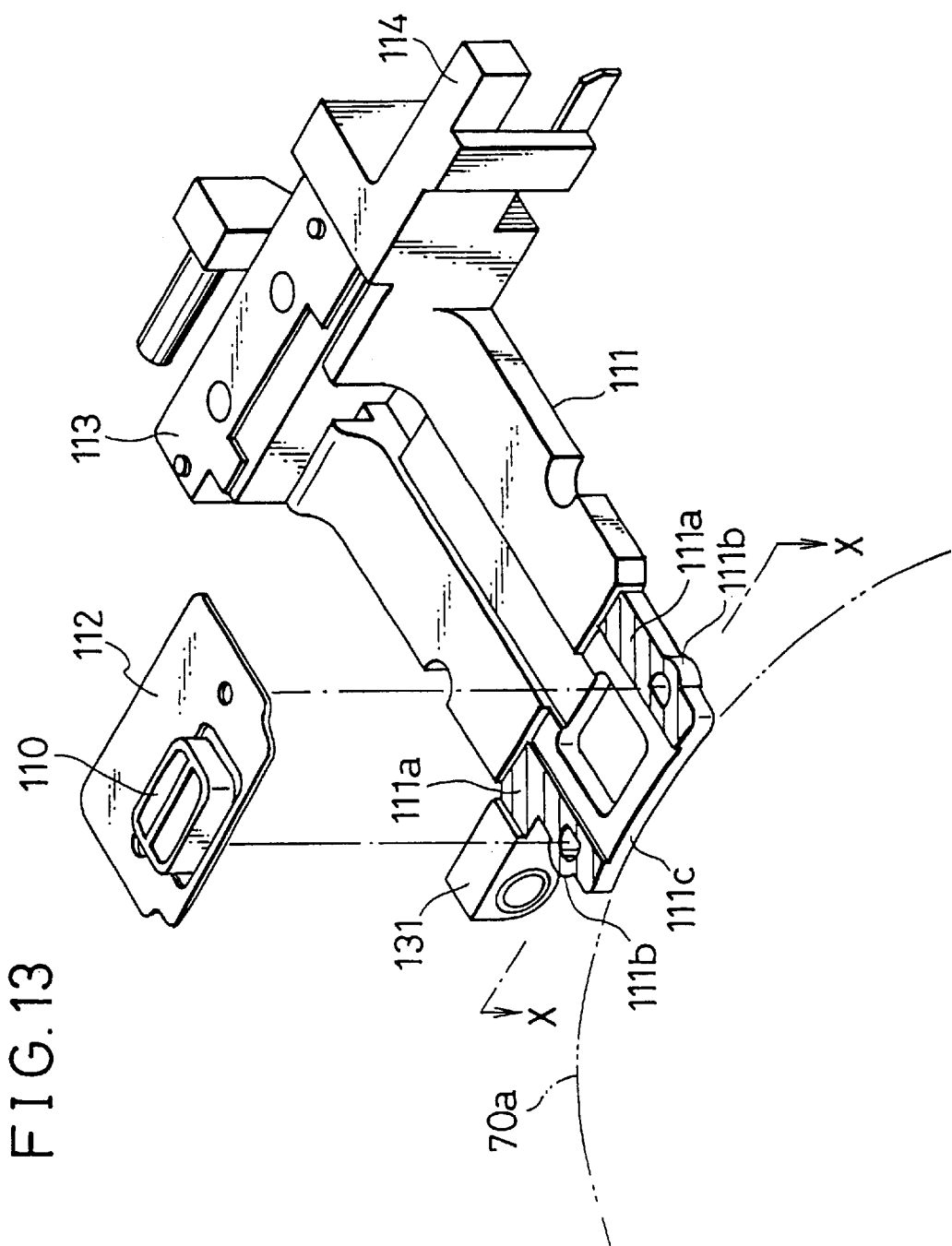
FIG. 13 is a perspective view showing a lower magnetic head constituting the magnetic head unit shown in FIG. 12B and a lower head support member having the head mounted on its distal end.

As shown in FIG. 13, the front end portion (free end) of the lower head support member 111 is fitted with a lower magnetic head 110 through a bonding plate 112, and the rear end portion is formed with a pedestal 113 for fixing the upper head support member 121. A bearing portion 114 extends sideways (to the right) from a side edge portion of the lower head support member 111. The bearing portion 114 engages the head drive mechanism 80 (screw shaft 82 of a stepping motor 81) shown in FIG. 4.

The stepping motor 81 rotates in response to a driving signal which is delivered from a connector 95 (mentioned later) on the control circuit board 90 (FIG. 4) through a signal line 97, thereby moving the magnetic head unit 100 step by step in the longitudinal direction. The position of the magnetic head unit 100 which is driven in the axial direction of the screw shaft 82 by the stepping motor 81 is detected by a reference position sensor 38 which is attached to the frame 30.

The sheet-shaped bonding plate 112 on which the lower magnetic head 110 is fixed is bonded to the distal end portion of the lower head support member 111. An instantaneous adhesive agent (e.g., α-cianoacrylate adhesive agent) and an ultraviolet-effect adhesive agent (UV adhesive agent) are used in combination for the bonding.

The instantaneous adhesive agent is applied to a region 111a (indicated by hatching in FIG. 13) on the upper surface of the distal end of the lower head support member 111, while the UV adhesive agent is spread between the bonding plate 112 and opposite side edges 111b of the distal end of the lower head support member 111, as designated by numeral 111b in FIG. 14.

If a distal end edge 111c of the lower head support member 111 is curved after the outer periphery of the turntable 70a that constitutes the disk drive mechanism 70, as shown in FIG. 13, wider areas for application of the instantaneous adhesive agent and the UV adhesive agent can be secured than in the case where the distal end edge 111c of the lower head support member 111 is straight. In consequence, the strength of bonding of the bonding plate 112 to the lower head support member 111 is augmented correspondingly.

Figure 15A:
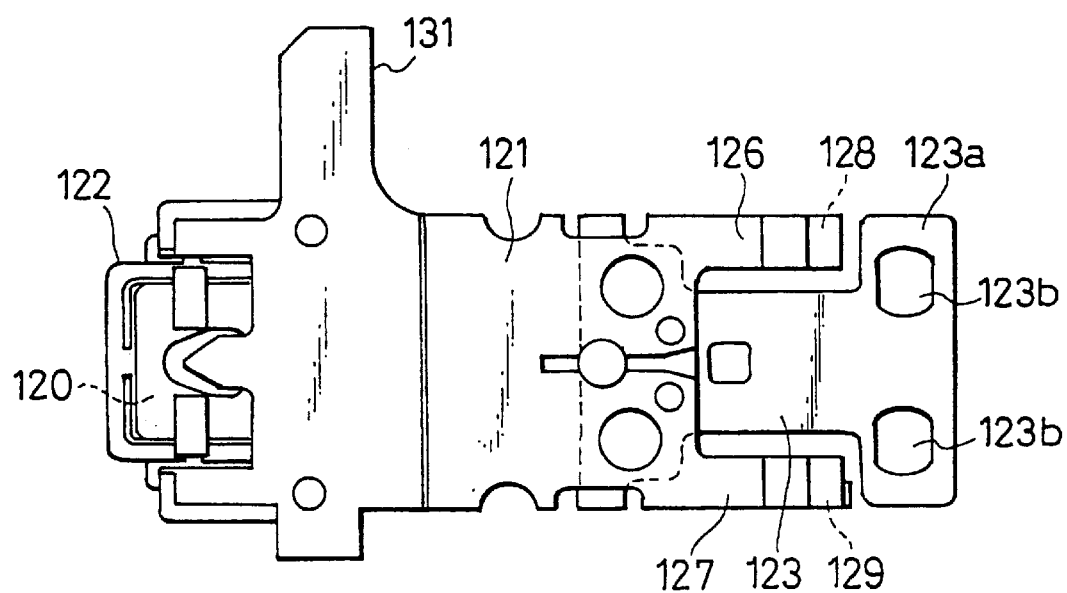
FIG. 15A is a plan view of an upper head support member that constitutes the magnetic head unit of FIG. 12A.
Figure 15B:
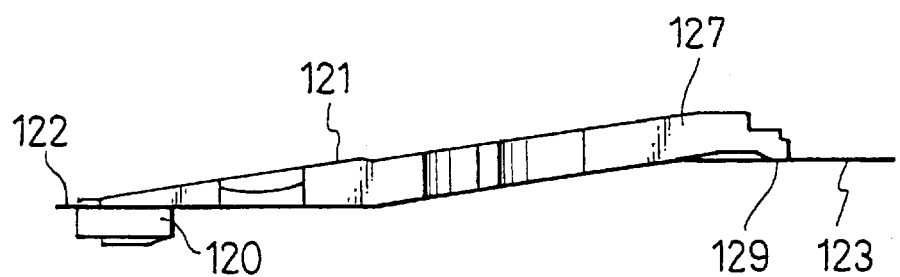
FIG. 15B is a side view of the upper head support member.

As shown in FIGS. 15A and 15B, the upper magnetic head 120 is mounted on the front end portion (free end) of the upper head support member 121 by a support spring 122 (gimbals spring). The distal end of a leaf spring member 123 is attached to the rear end portion of the upper head support member 121 by molding. The rear end of the leaf spring member 123 is situated close to the pedestal 113.

A rear portion 123a of the leaf spring member 123 extends on both sides, left and right, so that the whole leaf spring member 123 is in the shape of a T. A pair of tapped holes 123b, 123b are formed in the rear portion 123a of the leaf spring member 123. As shown in FIG. 12A, moreover, a fixing member 124 formed of a metallic plate is put on top of the rear portion 123a of the leaf spring member 123, and screws 125 are driven into the pedestal 113 through the tapped holes 123b, individually. Thus, the rear portion 123a of the leaf spring member 123 is fixed to the pedestal 113.

As shown in FIG. 12A, first and second leg portions 126 and 127 extend backward (or toward the pedestal 113) from the left- and right-hand portions of the rear end of the upper head support member 121, respectively, so as to hold the leaf spring member 123 with narrow gaps between them. First and second rocking fulcrums 128 and 129 project toward the pedestal 113 from the lower surfaces of the respective rear end portions of the first and second leg portions 126 and 127.

A first cover portion 124a is formed on the fixing member 124, corresponding in position to the rear end portion of the first leg portion 126, and a second cover portion 124b corresponding in position to the rear end portion of the second leg portion 127. The first cover portion 124a covers the outer periphery of the rear end portion of the first leg portion 126, while the second cover portion 124b covers the outer periphery of the rear end portion of the second leg portion 127, thereby restraining the first and second rocking fulcrums 128 and 129 from excessively lifting from the pedestal 113.

As shown in FIG. 12A, the pedestal 113 is provided with a coil spring 130 for continually urging the central portion of the upper surface of the upper head support member 121 downward.

As shown in FIG. 12A, a projecting piece 131 extends sideways from the side edge of the upper head support member 121 opposite the bearing portion 114. Thus, the projecting piece 131 extends on the side where an upper magnetic head lift mechanism 60 is located, as shown in FIGS. 16A and 17A.

When the upper head support member 121 is not lifted by the upper magnetic head lift mechanism 60 (FIGS. 17A and 17B), the first and second leg portions 126 and 127 and the first and second rocking fulcrums 128 and 129 are all in contact with the pedestal 113.

Figure 16A:
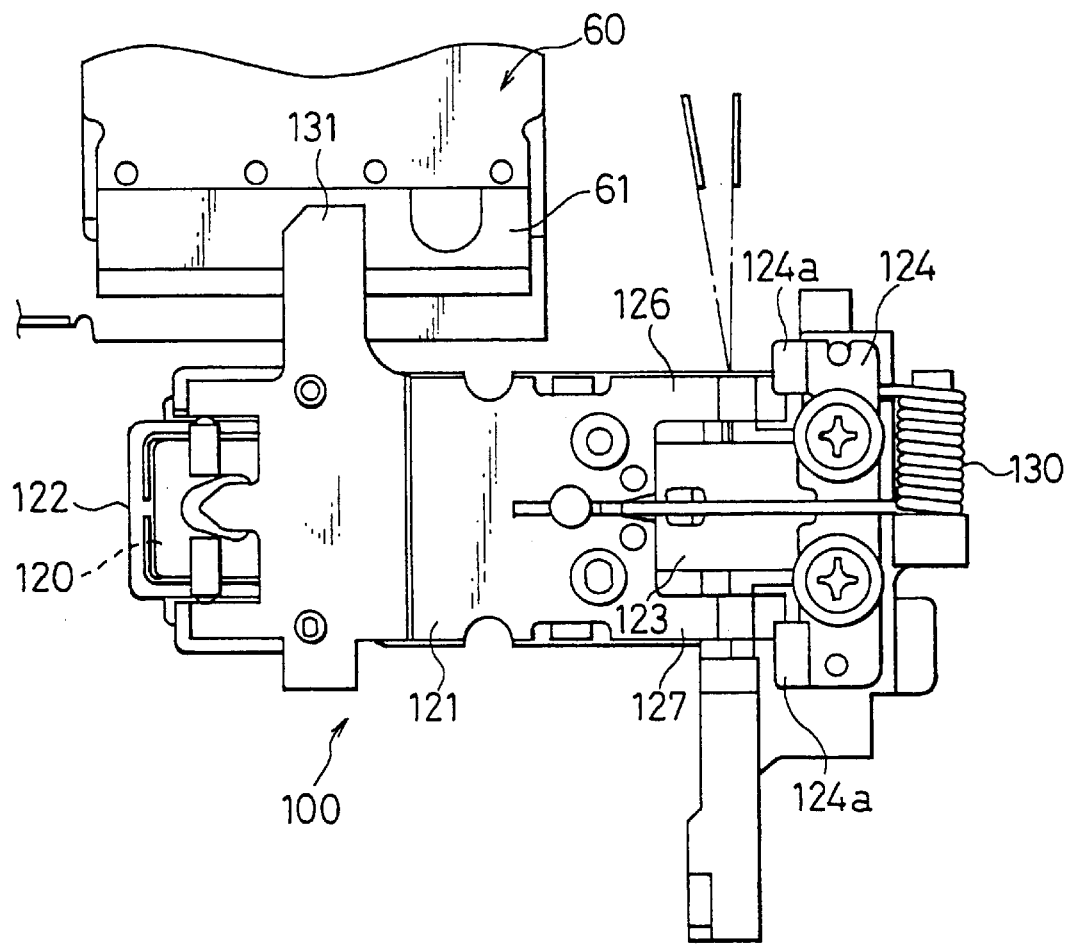
FIG. 16A is a plan view for illustrating the lift operation of the upper head support member.
Figure 16B:
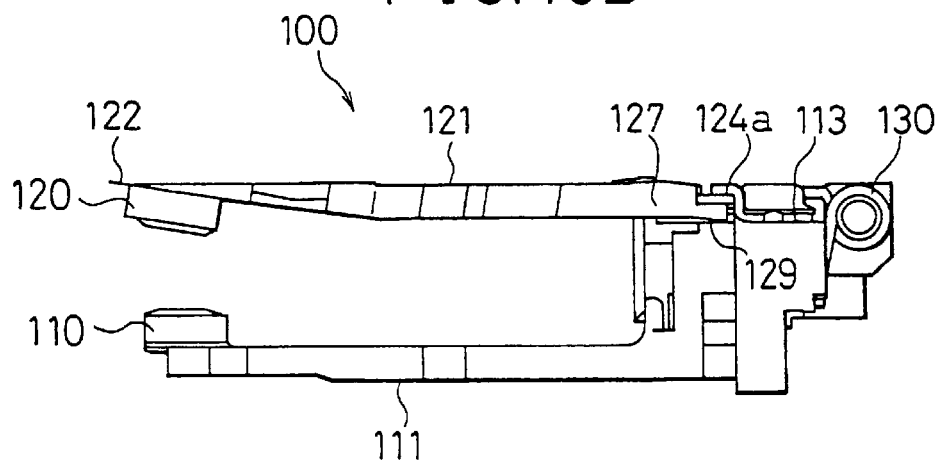
FIG. 16B is a side view of the upper head support member.
Figure 17A:
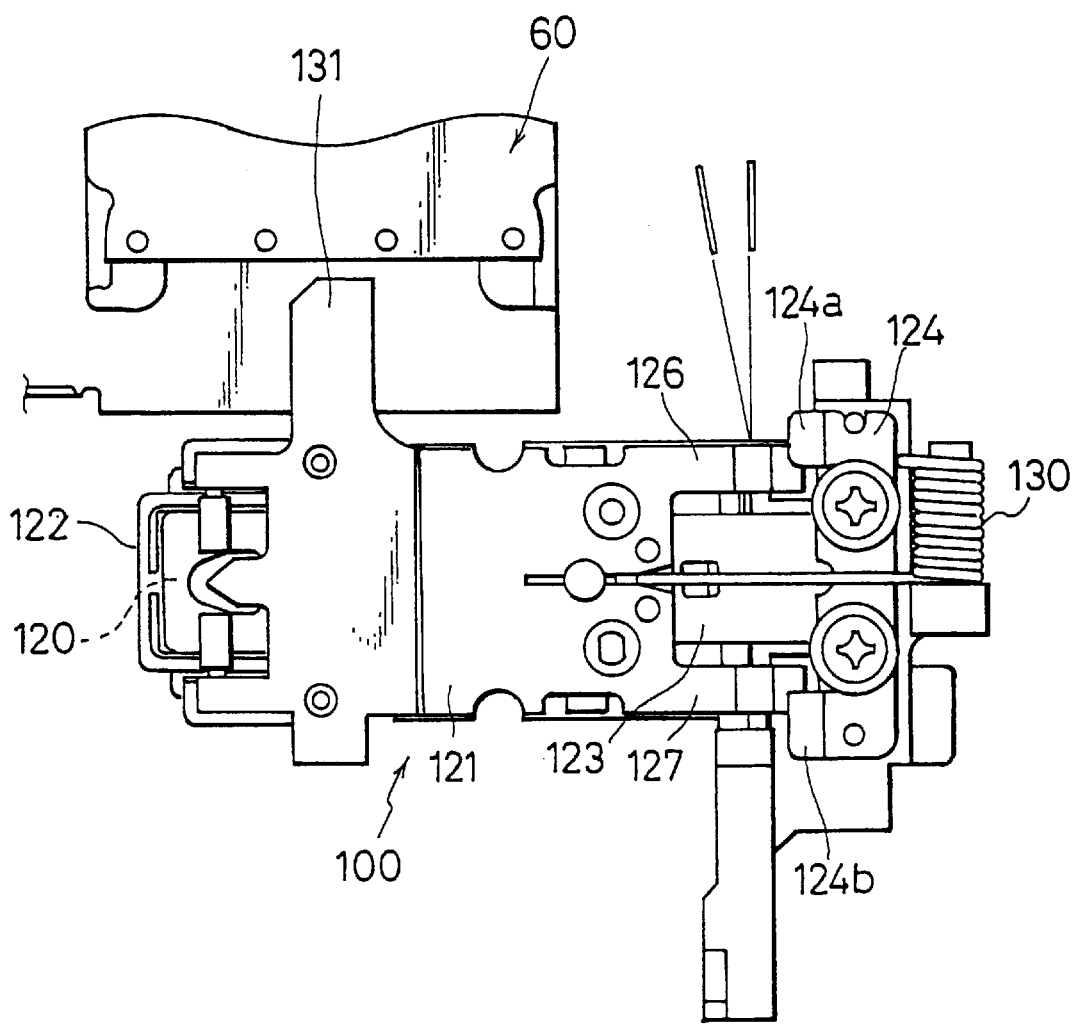
FIG. 17A is a plan view for illustrating the lift operation of the upper head support member.

If a slide piece 61 of the lift mechanism 60 projects to lift the projecting piece 131 from below, as shown in FIG. 16A, the first rocking fulcrum 128 of the first leg portion 126 lifts, so that the upper head support member 121 rocks around the second rocking fulcrum 129 of the second leg portion 127, and the upper magnetic head 120 ascends. In consequence, a gap into which the disk of the floppy disk 200 is to be inserted is formed between the upper magnetic head 120 and the lower magnetic head 110, as shown in FIG. 16B.

The following is a description of the first and second rocking fulcrums 128 and 129 that are formed on the first and second leg portions 126 and 127 of the upper head support member 121, respectively.

Figure 18A:
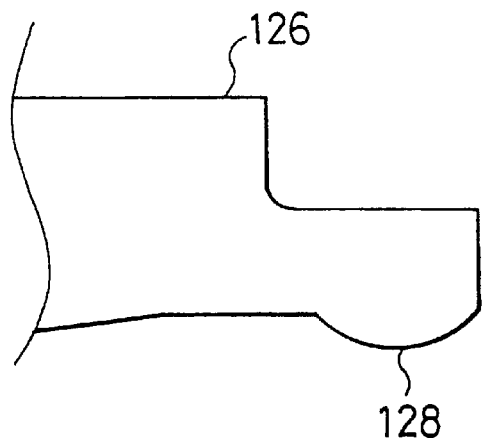
FIG. 18A is a view showing a profile of a first rocking fulcrum of the upper head support member.

As shown in FIG. 18A, the first rocking fulcrum 128 is formed of a semicylindrical protuberance with a substantially semicircular cross section, and is in linear contact with the pedestal 113. Alternatively, the first rocking fulcrum 128 may be formed having a hemispherical shape such that it can be in point contact with the pedestal 113.

Figure 17B:
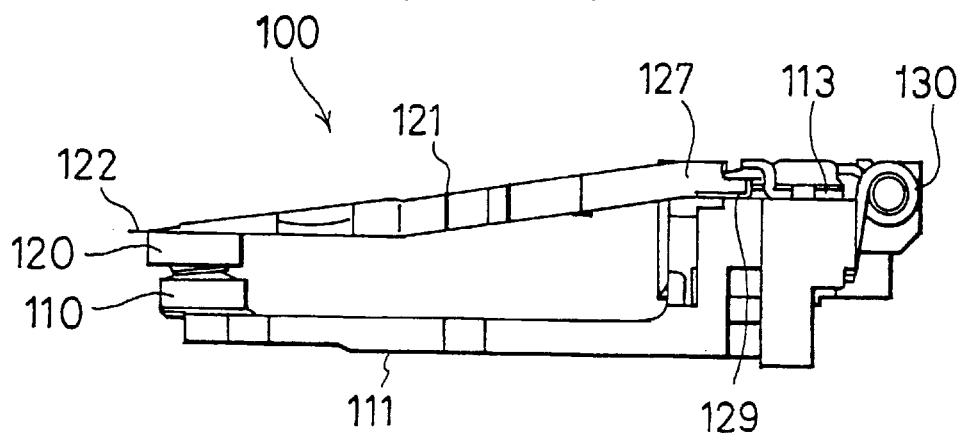
FIG. 17B is a side view of the upper head support member.
Figure 18B:
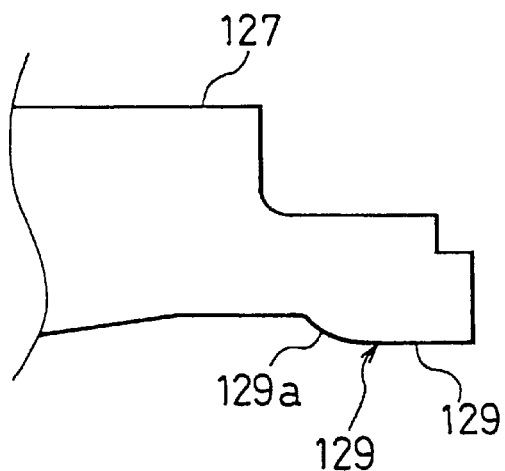
FIG. 18B is a view showing a profile of a second rocking fulcrum.
Figure 18C:
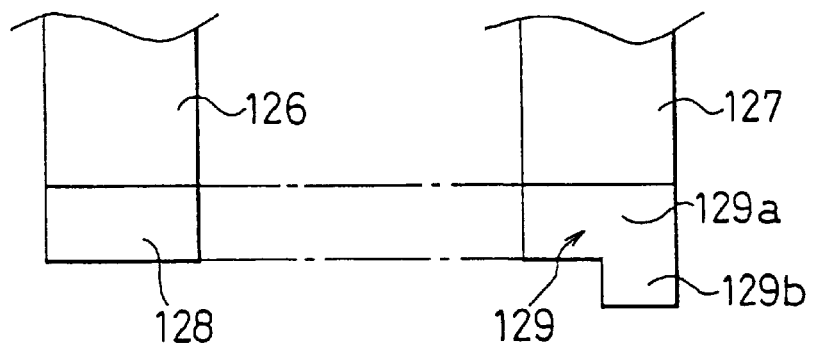
FIG. 18C is a plan view of the first and second rocking fulcrums.

As shown in FIG. 18B, on the other hand, the front part of the second rocking fulcrum 129 forms a curved portion 129a having the same shape as a portion of the first rocking fulcrum 128 which is situated ahead of the center. However, the rear part of the second rocking fulcrum 129, unlike the shape of the rear part of the first rocking fulcrum 128, forms a flat surface portion 129b, and extends backward so that it is a little longer than the first rocking fulcrum 128 (see FIG. 18C). When the distal end of the upper head support member 121 is situated in its down position, as shown in FIG. 17B, both the first rocking fulcrum 128 and the flat surface portion 129b of the second rocking fulcrum 129 are in contact with the pedestal 113.

Figure 19A:
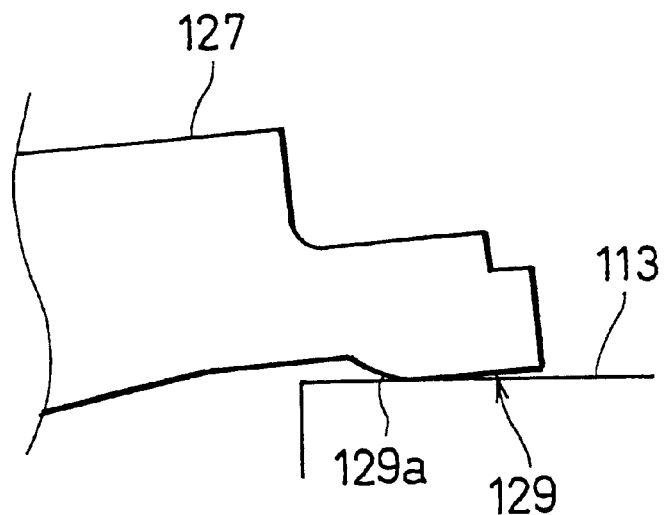
FIGS. 19A and 19B are views showing a displacement of the second rocking fulcrum of FIG. 18B.

FIG. 19A shows the posture of the second leg portion 127 taken when the distal end of the upper head support member 121 is lowered. At this point of time, the second rocking fulcrum 129 is located such that its curved portion 129a is in contact with the pedestal 113 while its flat surface portion 129b is lifted above the pedestal 113. Since the curved portion 129a of the second rocking fulcrum 129 has the same shape as its corresponding portion of the first rocking fulcrum 128, as mentioned before, the upper head support member 121 and the leaf spring member 123 do not tilt left or right.

Figure 19B:
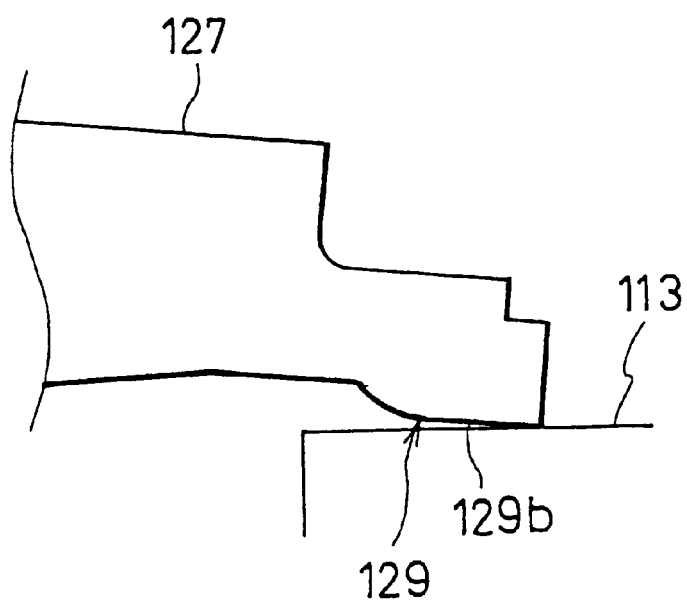

If the distal end of the upper head support member 121 is lifted as the slide piece 61 advances under the projecting piece 131, on the other hand, the first rocking fulcrum 128 lifts above the pedestal 113, and the region of the second rocking fulcrum 129 in contact with the pedestal 113 shifts backward to the rear end edge of the flat surface portion 129b, as shown in FIG. 19B. If the distal end of the upper head support member 121 is further lifted, the contact region of the second rocking fulcrum 129 on the pedestal 113 shifts further backward from the flat surface portion 129b.

When the projecting piece 131 of the upper head support member 121 is lifted by the slide piece 61 of the lift mechanism 60, therefore, the distance from the projecting piece 131 to the contact region of the second rocking fulcrum 129 on the pedestal 113 gradually increases, so that the inclination angle of a straight line connecting the projecting piece 131 and the contact region of the second rocking fulcrum 129 on the pedestal 113 with respect to the horizontal plane (top plate 11 of the carrier 10) can be restrained from increasing. In consequence, crosswise twist of the leaf spring member 123 can be eased.

If the lift of the front portion of the second rocking fulcrum 129, which is caused while the contact region between the second rocking fulcrum 129 and the pedestal 113 moves backward as the front end of the upper head support member 121 is lifted by the slide piece 61, is equalized to the lift of the first rocking fulcrum 128, the upper head support member 121 can always be kept free from crosswise inclination, that is, the leaf spring member 123 can be kept from twisting.

Figure 20A:
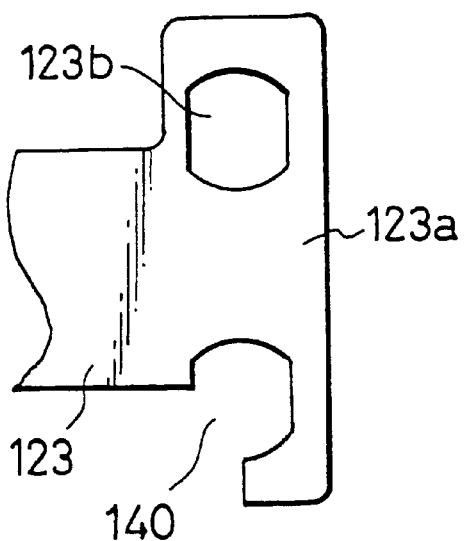
FIGS. 20A and 20B are views showing first and modifications, respectively, of a leaf spring member used in FIG. 15A.
Figure 20B:
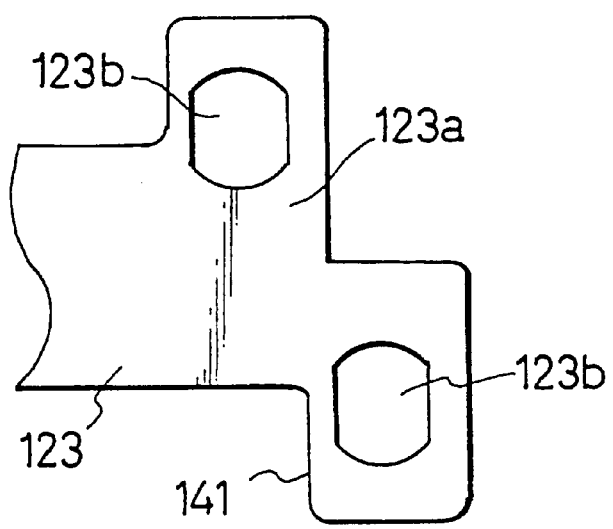

If there is a possibility of the second leg portion 127 interfering with the leaf spring member 123, a notch 140 is formed in a proximal portion 123a of the leaf spring member 123, as shown in FIG. 20A. Alternatively, the leaf spring member 123 may be stepped so that a region 141 that may possibly interfere with the rear end portion of the second leg portion 127 is retreated, as shown in FIG. 20B. If there is a possibility of the second cover member 124b on the fixing member 124 interfering with the rear end portion of the second leg portion 127, moreover, the second cover member 124b should preferably be moved backward.

[Upper Magnetic Head Lift Mechanism]

The following is a description of the mechanism for lifting the upper head support member 121 that has the upper magnetic head 120 mounted on its distal end.

In order to raise the upper head support member 121, a link member 62 which is supported on a pivot 63 is rocked clockwise around the pivot 63. As the link member 62 rocks in this manner, the slide piece 61 moves straight in the direction of arrow B, so that the distal end of the slide piece 61 gets under the projecting piece 131 of the upper head support member.

Figure 21:
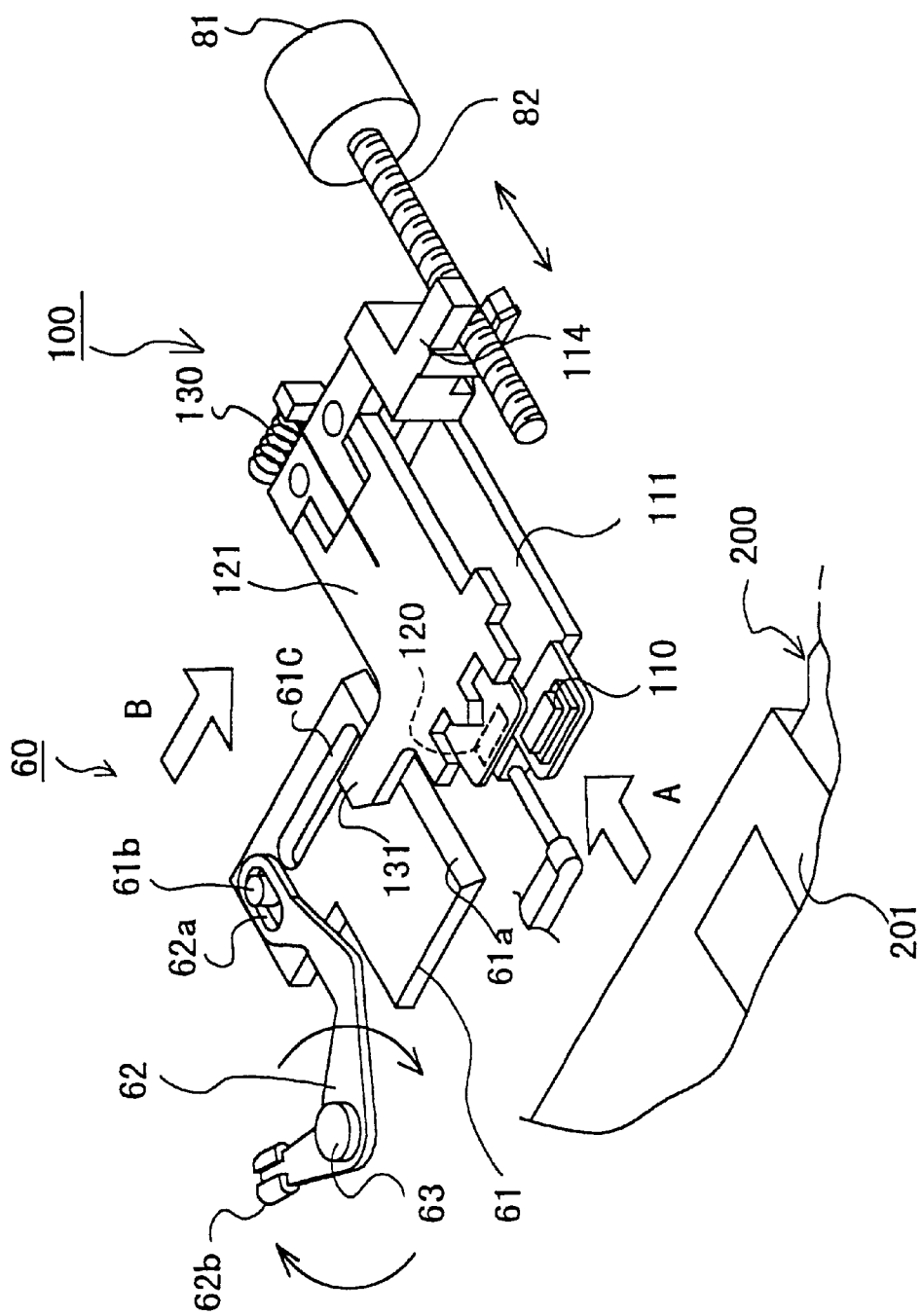
FIG. 21 is a view for illustrating the respective operations of the magnetic head unit and the upper magnetic head lift mechanism.

The mechanism for lifting the upper head support member 121 will now be described with reference to FIG. 21. In FIG. 21, the floppy disk loading direction and the projecting direction of the slide piece are indicated by arrows A and B, respectively.

The slide piece 61 is a rectangular flat plate of polyacetal, and its projecting side forms a guide surface 61a that declines like a single edge. A pin 61b protrudes from that end portion of the slide piece 61 opposite the guide surface 61a.

The link member 62 has a slot 62a in one end (first end portion) thereof, and the opposite sides of its other end (second end portion) are bent and folded to form an engaging portion 62b. The link member 62 is supported by the pivot 63 provided on the top plate 11 of the carrier 10 in a position on its central portion near to the second end portion, and can rock over the carrier 10. As shown in FIG. 10B, the engaging portion 62b of the link member 62 is in engagement with a flute 28 which is formed on a left-hand side wall 23 of the slider 20. Further, the slot 62a of the link member 62 is in engagement with the pin 61b of the slide piece 61.

If the slider 20 moves relatively to the carrier 10, therefore, the link member 62 rocks around the pivot 63, thereby causing the slide piece 61 to move in the direction of arrow B of FIG. 21 or in the opposite direction. When the slide piece 61 projects in the direction of arrow B of FIG. 21, the upper head support member 121 rocks against the urging force of the spring 130, whereupon its distal end portion ascends. If the slide piece 61 retreats in the direction opposite to the direction of arrow B of FIG. 21, in contrast with this, the upper head support member 121 is urged to rock by the spring 130, whereupon its distal end portion descends.

Figure 22:
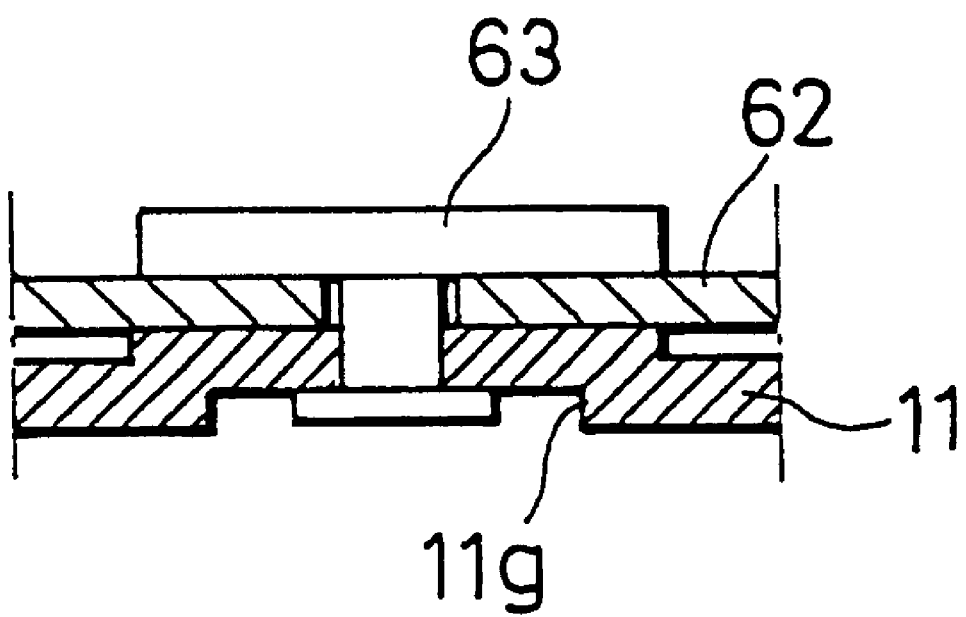
FIG. 22 is a view illustrating the way a pivot supporting a link member is mounted on the carrier.

As shown in FIG. 22, the region of the top plate 11 which receives the pivot 63 and its periphery are projected upward by drawing lest the lower end of the pivot 63 which is mounted on the top plate 11 of the carrier 10 should project upward from the lower surface of the top plate 11 and run against the floppy disk 200. Further, a disk portion 63a which is formed integrally with the lower end of the pivot 63 is stored in a recess 11g in the lower surface of the top plate 11 which is created as the projection is formed. Thus, the disk portion 63a never projects downward from the lower surface of the top plate 11 of the carrier 10.

As shown in FIG. 3, the slide piece 61 moves on the top plate 11 in a manner such that its front and rear sides are guided individually by guide pieces 11a, 11a that are raised upward from the top plate 11 of the carrier 10. A cover 28 is fixed to a burring portion on the carrier 10 by two screws 64 from above the slide piece 61. One of the screws 64 is passed through a slot 61c (see FIG. 21) in the slide piece 61 and driven into the top plate 11 of the carrier 10. This screw 64 is fitted with a sleeve for smoothing the contact with the slide piece 61.

When the disk drive unit is not loaded with the floppy disk 200, as described before with reference to FIG. 10B, each engaging projection 13 of the carrier 10 is situated in the horizontal guide hole 24b that connects with the upper part of the slanting guide hole 24 of the side wall 23 of the slider 20. At the same time, the engaging portion 62b at the distal end of the link member 62 is situated in the upper part of the flute 28 in the left-hand side wall 23 of the slider 20. As this is done, the link member 62 rocks clockwise around the pivot 63, as shown in FIG. 21, so that slide piece 61 moves in the direction of arrow B of FIG. 21 and advances to the region under the projecting piece 131 of the upper head support member 121, thereby pushing up the upper head support member 121.

Figure 11A:
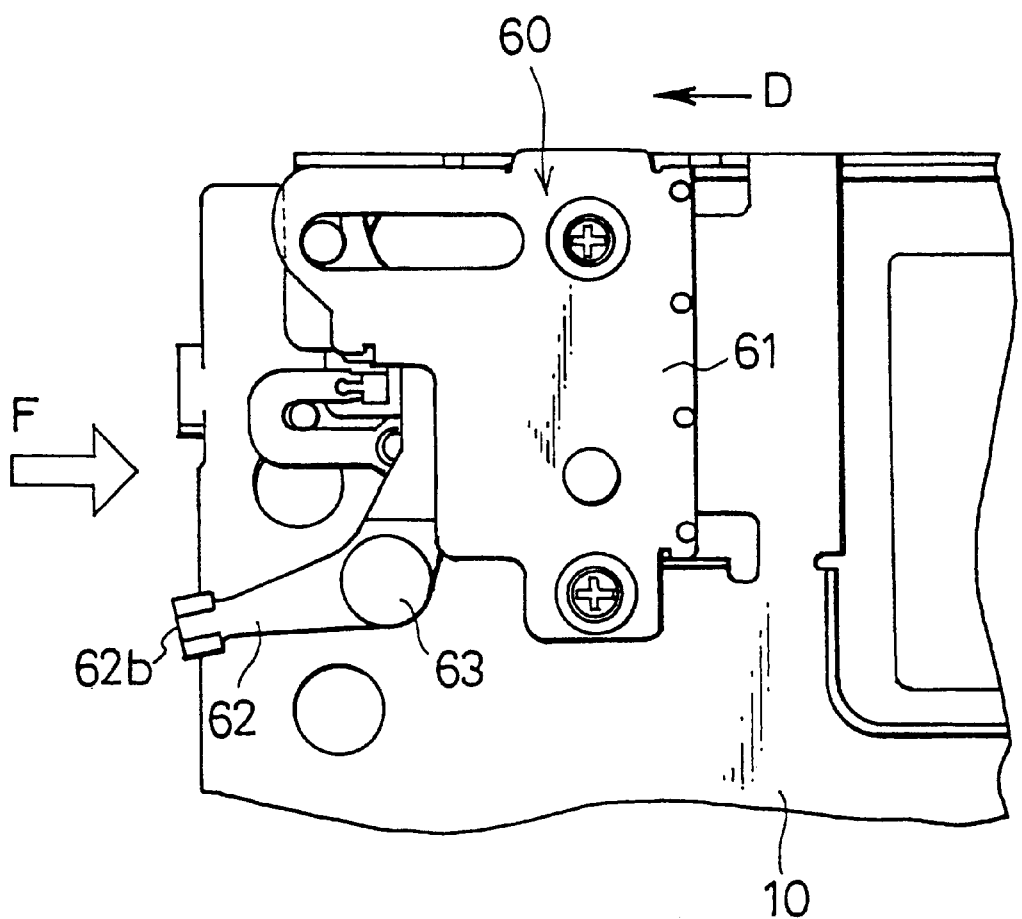
FIG. 11A is a plan view showing the upper magnetic head lift mechanism provided on the carrier.
Figure 11B:
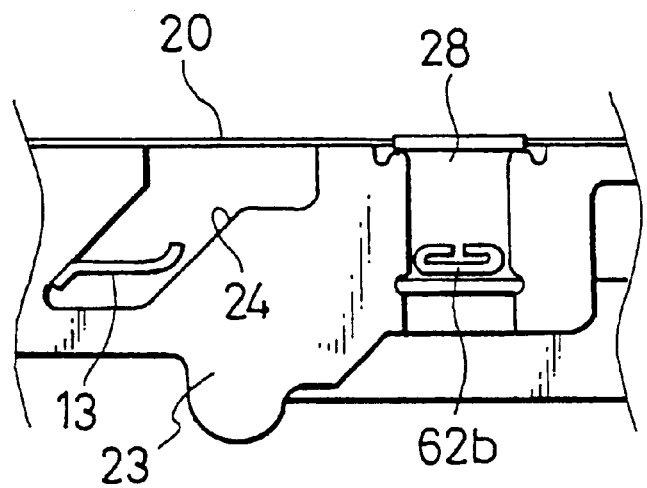
FIG. 11B is a side view taken in the direction of arrow A of FIG. 11A.

If the floppy disk 200 is inserted into the disk drive unit, the movement of the slider 20 in the floppy disk unloading direction with respect to the carrier 10 is caused, as mentioned before. Thereupon, each engaging projection 13 of the carrier 10 descends along the slanting guide hole 24 of the side wall 23 of the slider 20, so that the engaging portion 62b at the distal end of the link member 62 is situated in the lower part of the flute 28 in the left-hand side wall 23 of the slider 20, as shown in FIGS. 11A and 11B. In this process, the flute 28 in the left-hand side wall 23 of the slider 20 pulls the engaging portion 62b at the distal end of the link member 62, which is in engagement therewith, in the floppy disk unloading direction, so that the link member 62 rotates counterclockwise around the pivot 63.

In consequence, the slide piece 61 moves in the direction opposite to arrow B of FIG. 21 (or in the direction of arrow D of FIG. 11A) and recedes from under the projecting piece 131 of the upper head support member 121.

Then, the upper head support member 121 is urged to rock by the spring 130, whereupon the upper magnetic head 120 on its distal end is brought into contact with the disk in the floppy disk 200.

[Control Circuit Board]

Figure 33:
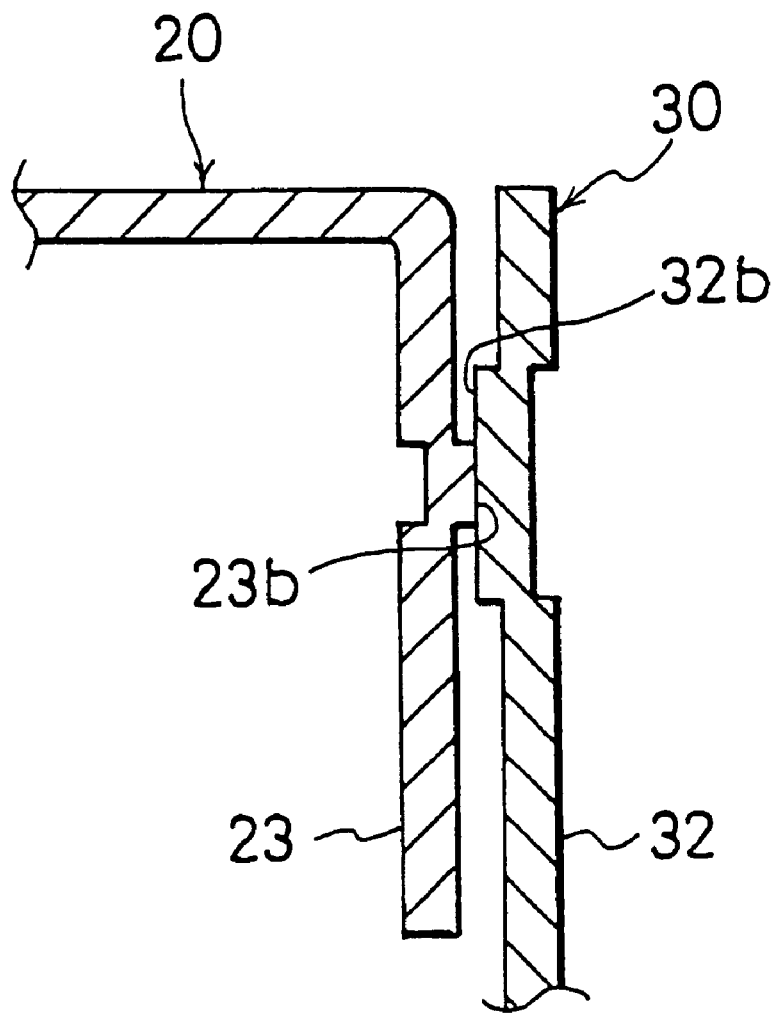
FIG. 33 is a sectional view of the slider and the frame of FIG. 32.

Arranged on the control circuit board 90, as shown in FIG. 4 and a partial enlarged view of FIG. 33, are an interface connector 92, an input-output terminal 93 for disk drive motor, a head connector 94, the stepping motor connector 95, and a control IC 96.

The interface connector 92, which serves for the delivery of signals to or from a computer which is furnished with the disk drive unit, is located on the rear end portion of the control circuit board 90. In contrast with this, the input-output terminal 93 for disk drive motor is located on the front end portion of the control circuit board 90 and is situated close to the disk drive mechanism 70. The head connector 94, which serves to transmit to or receive input or output signals from the lower magnetic head 110 and the upper magnetic head 120, is placed in a substantially central position on the control circuit board 90 which is a little closer to the magnetic head unit 100. The stepping motor connector 95, which serves to apply driving signals (pulse signals) to the stepping motor 81 that constitutes the head drive mechanism 80, is located on the left-hand end portion of the control circuit board 90, and is situated close to the side wall 32 of the frame 30 and as remote from the head connector 94 as possible. On the other hand, the control IC 96 is situated close to the head connector 94.

An FPC (flexible printed circuit) 98, a thin, flat flexible connector, is used as the signal line 97 that electrically connects the stepping motor 81 and the stepping motor connector 95. Starting from the stepping motor connector 95, the signal line 97 (FPC 98) extends along the left-hand side wall 32 of the frame 30 toward the rear wall 33, then advances to the right from the left-hand end of the rear wall 33 of the frame 30 along the rear wall 33, and reaches the stepping motor 81. The FPC 98, which is placed along the rear wall 33, is fixed to the inner surface of the rear wall 33 with an adhesive agent.

Further, a signal line 99 of the reference position sensor 38 is included in the FPC 98. Furthermore, a connector which is connected to the reference position sensor 38 by the signal line 99 (FPC 98) is formed integrally with the stepping motor connector 95.

When the disk drive unit is loaded with the floppy disk 200, infinitesimal currents flow through the individual components and signal lines on the control circuit board 90, and various currents, such as pulse current for driving the stepping motor 81, relatively high current for driving the disk drive motor, etc., are generated around the control circuit board 90. As mentioned before, however, the head connector 94 and the stepping motor connector 95 are arranged apart, left and right, from each other on the control circuit board 90, so that signals can be restrained from crossing each other or that one of the signals can be restrained from constituting a noise source against the other.

Since the signal line 97 that connects the stepping motor 81 and the stepping motor connector 95 is bonded in the form of the FPC 98 to the rear wall 33 of the frame 30, hardly any space for the distribution of the signal line 97 is required in the frame 30, and the rear wall 33 of the frame 30 is shielded against the signal line 97. Accordingly, the possibility of noises coming in or going out from the frame 30 can be reduced.

Further, the distance between the interface connector 92 and the input-output terminal 93 for disk drive motor is so long that signals can be restrained from crossing each other or that one of the signals can be restrained from constituting a noise source against the other.

Figure 24A:
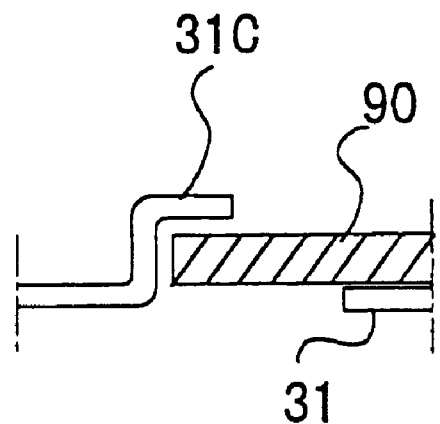
FIGS. 24A and 24B are sectional views of the control circuit board of FIG. 23 taken in different directions.
Figure 24B:
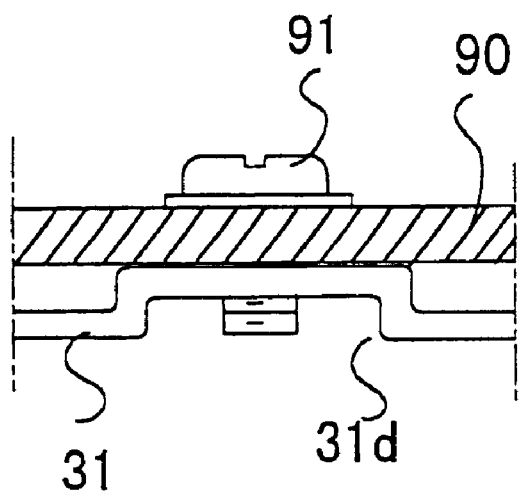

The control circuit board 90 has its left-hand front portion in engagement with an engaging lug 31c (FIG. 24A), which is raised from the base plate 31 of the frame 30, and its three portions, its right-hand front portion and left- and right-hand rear portions, fixed to the base plate 31 of the frame 30 by screws 91. As shown in FIG. 24B, a projection having a circular cross section is formed projecting upward from the periphery of a region for an internal thread for receiving each screw 91 by drawing. In consequence, a recess 31d is formed in the lower surface of the base plate 31. If the screw 91 is driven in, therefore, its lower end portion can be situated in the recess 31d without projecting further downward.

Figure 23:
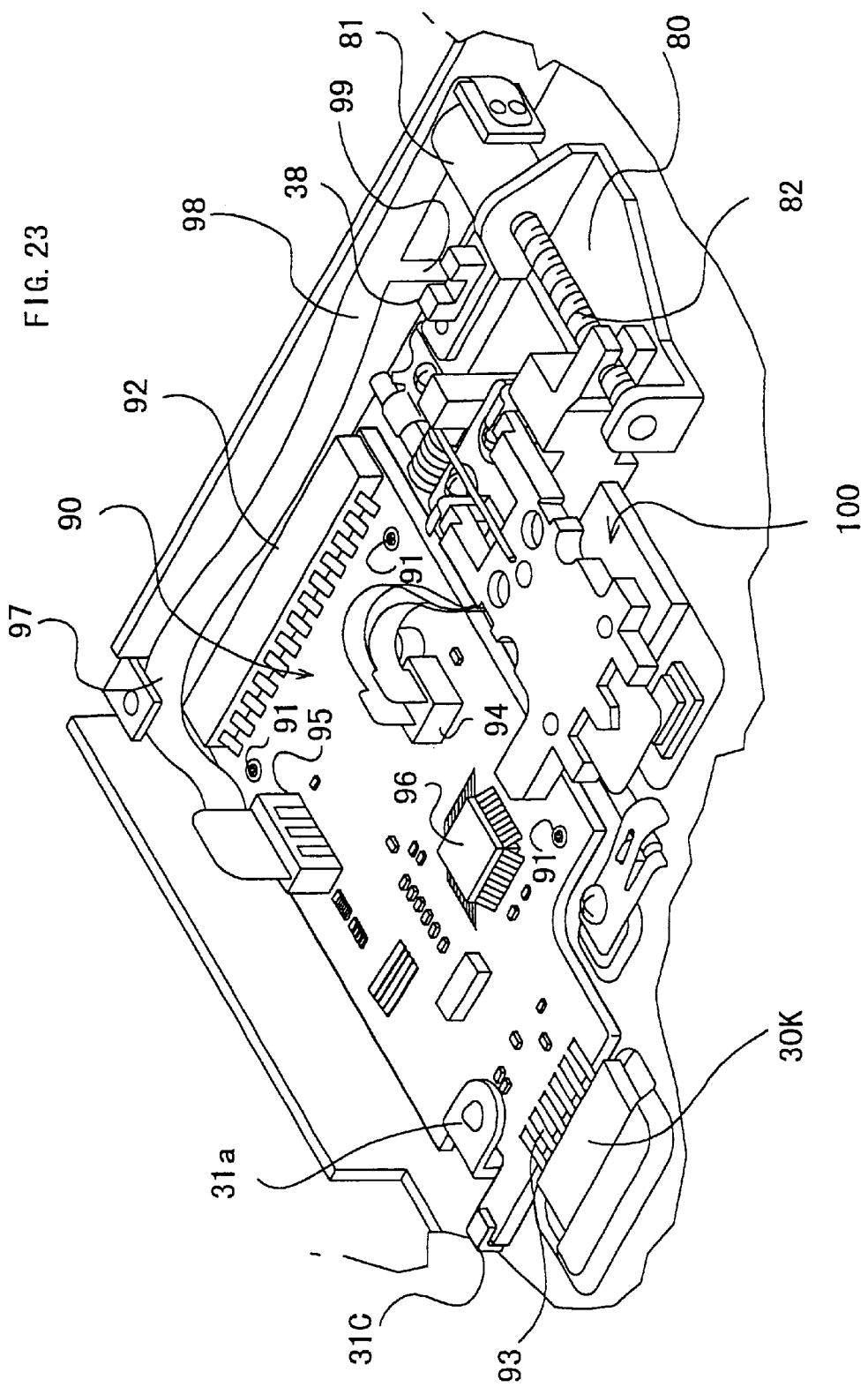
FIG. 23 is an enlarged view of a part of FIG. 4 illustrating a control circuit board mounted on the frame.

As shown in FIG. 23, the positioning lug 31a for positioning a floppy disk is formed so as to hang right over the left-hand front portion (region near a part in engagement with the engaging lug 31c) of the control circuit board 90. Thus, the positioning lug 31a is situated overlying and overlapping the control circuit board 90 at a certain distance from the control circuit board 90. Therefore, the area of the control circuit board 90 can be increased.

The engaging lug 31c is formed by vertically raising a part of the base plate 31 of the frame 30 and then bending the distal end portion of the vertically raised portion toward the inside of the frame 30 at right angles thereto (or horizontally). A hole which is formed by cutting to raise the base plate 31 is closed with the control circuit board 90.

[Connection between Control Circuit Board and Driver Circuit Board for Disk Drive Motor]

As shown in FIG. 4, a motor driver circuit board 71 for the disk drive motor that constitutes the disk drive mechanism 70 is provided near the front end of the frame 30. The motor driver circuit board 71 is connected electrically to the input-output terminal 93 for disk drive motor on the front end of the control circuit board 90 through a flexible connector 72 (FIG. 4) such as an FPC. Thus, the flexible connector 72 is located under the floppy disk 200 which is situated in the loaded position in the disk drive unit.

Figure 25A:
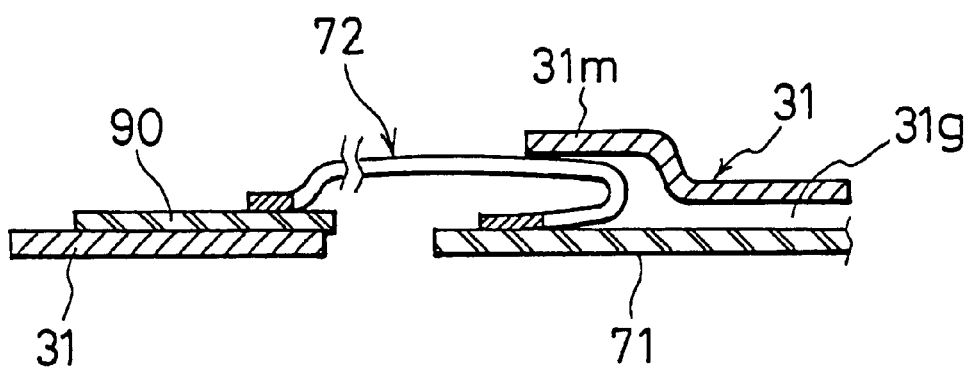
FIG. 25A is a view showing a first example of connection between the control circuit board of FIG. 23 and a driver circuit board for driving a disk drive motor by an FPC.

An opening is formed in a region of the base plate 31 of the frame 30 for the attachment of the motor driver circuit board 7. Then, a part of the base plate 31 that adjoins the opening is caused to project inward in two steps by press molding, as shown in FIG. 25A. The motor driver circuit board 71 is located in a first hollow 31g which is created in the lower surface of the base plate 31 on the side opposite the opening, and moreover, the bent flexible connector 72 is located in a second hollow 31m that faces the opening and is deeper than the first hollow 31g.

As shown in FIG. 25A, the flexible connector 72 that extends from the input-output terminal 93 for disk drive motor of the control circuit board 90 gets into the second hollow 31m through a side opening which is created between the motor driver circuit board 71 and the second hollow 31m, then bends once in the second hollow 31m, and connects with a terminal on the motor driver circuit board 71. The flexible connector 72 in the second hollow 31m is held down by the base plate 31 that constitutes the second hollow 31m. If the control circuit board 90 and the motor driver circuit board 71 are dislocated as they are mounted, therefore, the bend of the flexible connector 72 can absorb the dislocation.

If the base plate 31 of the frame 30 is projected upward to form first hollow 31g and the second hollow 31m in the base plate 31 of the frame 30, the base plate 31 never interferes with any other components, since it is situated under the floppy disk 200 in the loaded position in the disk drive unit, thereby securing a wide space. Since the flexible connector 72 is restrained from elastically rising up by the second hollow 31m, moreover, it never touches the floppy disk 200.

Since the flexible connector 72 is bent once in the case of FIG. 25A, furthermore, its surface which is bonded to the terminal 93 on the control circuit board 90 is different from the surface which is bonded to the terminal on the motor driver circuit board 71.

Figure 25B:
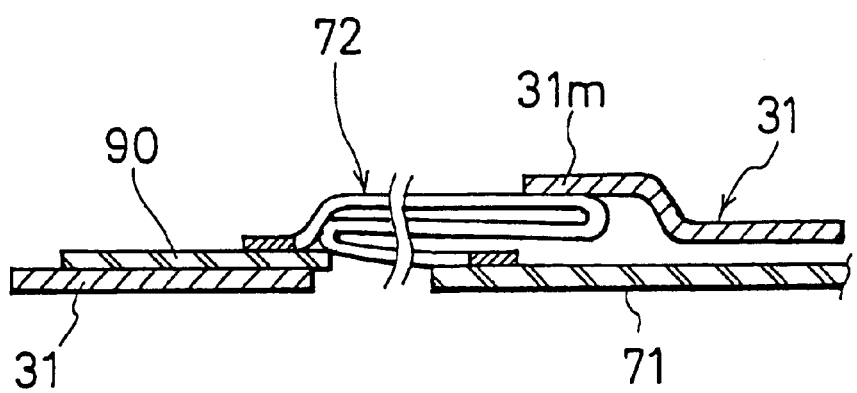
FIG. 25B is a view showing a second example of the connection.

If the flexible connector 72 is bent twice, as shown in FIG. 25B, therefore, the surface of the flexible connector 72 which is bonded to the terminal 93 on the control circuit board 90 is identical with the surface which is bonded to the terminal on the motor driver circuit board 71. Thus, a one-sided substrate can be used for the flexible connector 72.

[Structure for Taking out Slider from Frame]

Figure 26B:
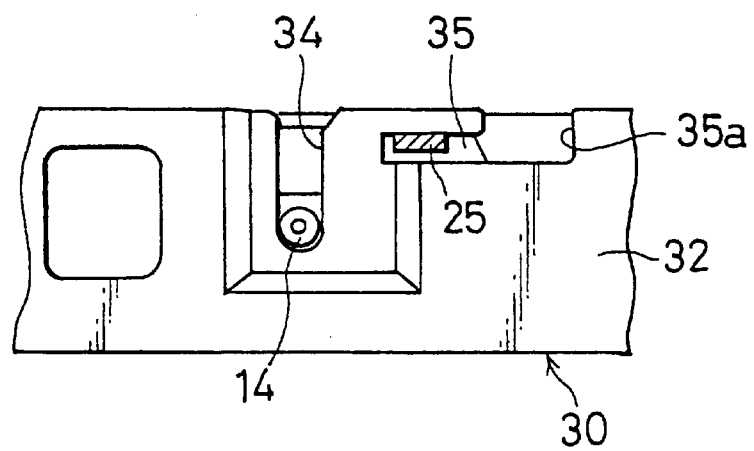
Figure 26C:
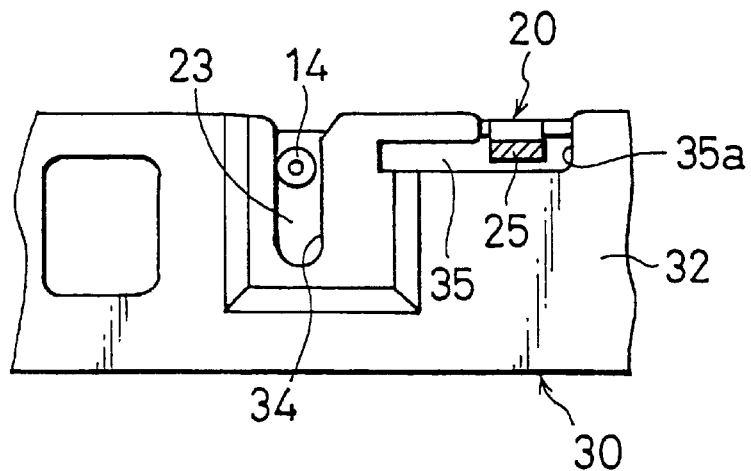

As shown in FIGS. 26A to 26C, the support slits 35 that are formed in the left- and right-hand side walls 32, 32 of the frame 30 extend in the floppy disk loading direction and then bend upward to open in the respective upper ends of the side walls 32, thereby forming apertures 35a at the rear ends. Thus, each support slit 35 has the shape of L fallen sideways.

When the disk drive unit is not loaded with the floppy disk 200, each engaging projection 25 of the slider 20 is situated in the position in the support slit 35 shown in FIG. 26A. When the slider 20 is in this position (hereinafter referred to as "first moved position"), a part (front half portion) of the engaging projection 25 engages the support slit 35, as shown in FIG. 26A.

If the floppy disk 200 is then inserted into the disk drive unit (arrow F of FIG. 26A indicates the loading direction for the floppy disk 200), the slider 20 moves forward with respect to the frame 30. Thus, the engaging projection 25 moves forward (in the direction opposite to arrow F of FIG. 26A) along the support slit 35. When the slider 20 is in this position (hereinafter referred to as "third moved position"), the entire engaging projection 25 engages the support slit 35, as shown in FIG. 26B.

If the slider 20 is placed in a second moved position where it is further pressed backward (in the direction of arrow F of FIG. 26A) from the first moved position, the engaging projection 25 is situated in each aperture 35a of the support slit 35, as shown in FIG. 26C. Since the width of the aperture 35a is greater than the width of the engaging projection 25, the engaging projection 25 can be disengaged from the support slit 35 when it is lifted. Thus, the slider 20 can be easily removed from the frame 30.

Figure 27:
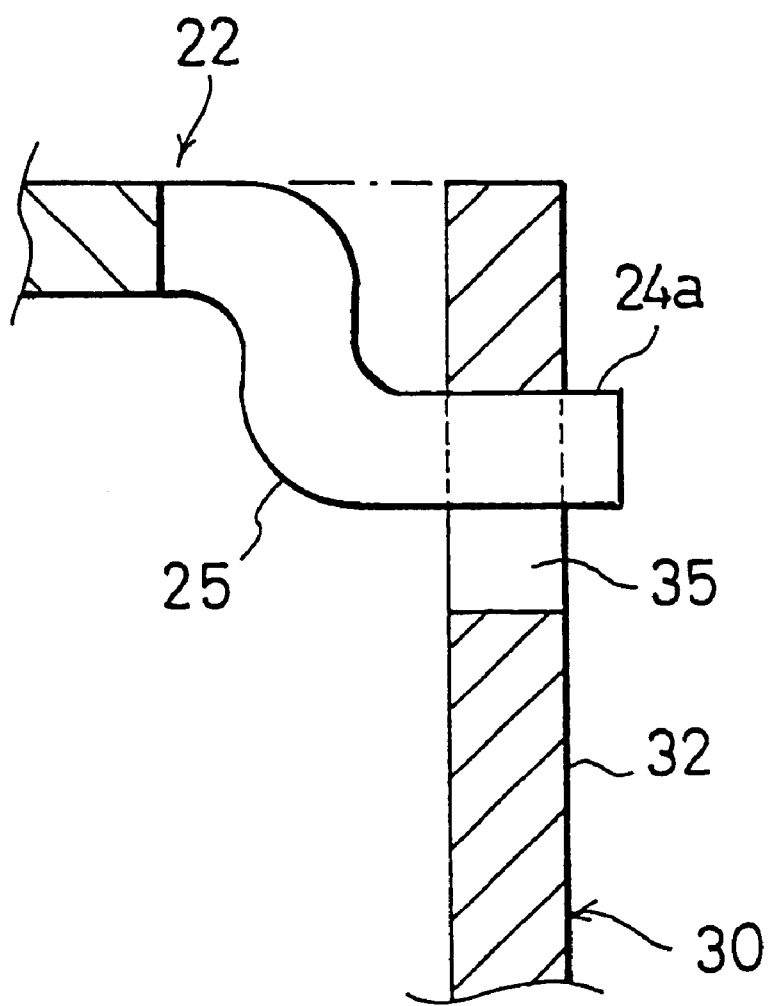
FIG. 27 is a view illustrating the shape of the engaging projection of FIG. 26B projecting in the support slit of the frame side wall.

As shown in FIG. 27, the engaging projection 25 extends sideways for a short distance from the side frame 22 of the slider 20, and bends downward after it, and further extends sideways again. When the distal end of the engaging projection 25 is in engagement with the support slit 35, therefore, the upper surface of the side frame 22 of the slider and the upper end portion of the side wall 32 of frame 30 are flush with each other. In consequence, the overall thickness (height) of the disk drive unit is restricted.

Figure 28A:
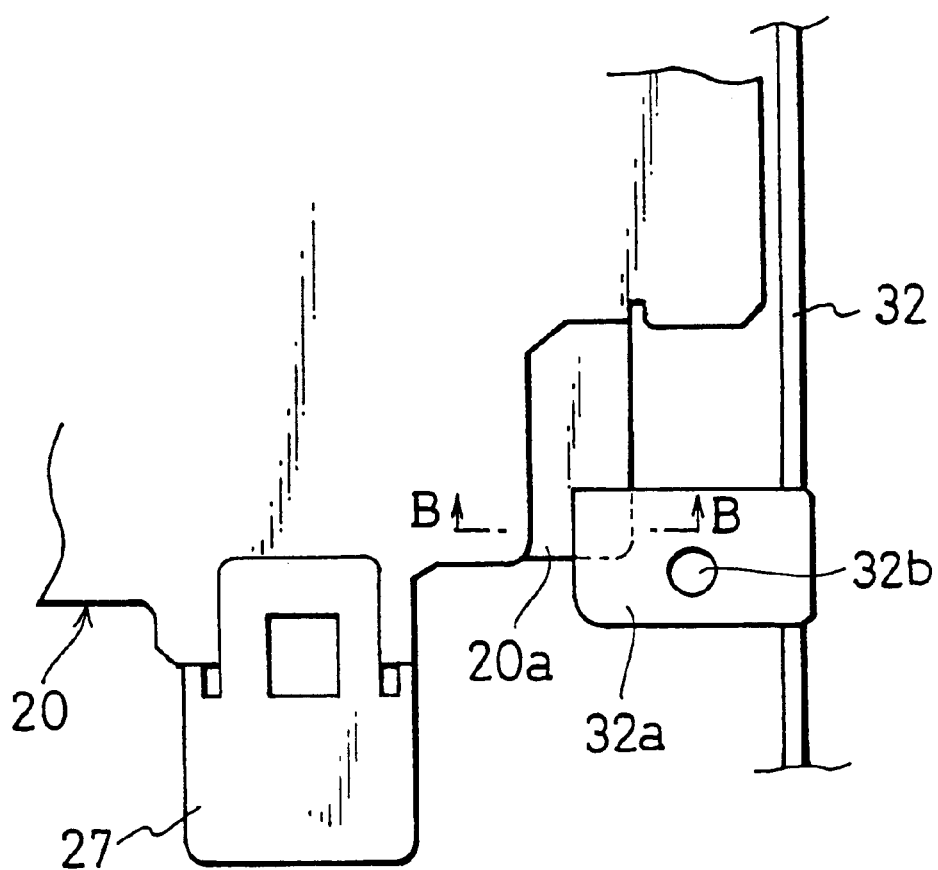
FIG. 28A is a view showing engagement between an engaging plate portion formed on the frame and an engaging portion formed on the slider.
Figure 28B:
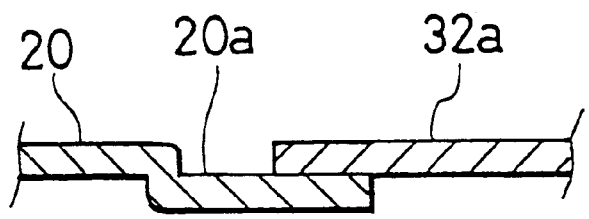
FIG. 28B is a sectional view taken along line B—B of FIG. 28A.

As shown in FIG. 28A, an engaging plate portion 32a protrudes from the front end portion of each of the left- and right-hand side walls 32 of the frame 30 toward the inside of the frame 30. On the other hand, an engaging portion 20a that can engage the engaging plate portion 32a of the frame 30 is formed on the point of the slider 20 where the front frame 21 and the side frame 22 intersect. As shown in FIG. 28B, the engaging portion 20a of the slider 20 is formed lower than the front frame 21 and the side frame 22 of the slider 20, leaving a difference in level. Further, the engaging portion 20a has a form extending in the floppy disk loading direction. FIG. 28A shows a state in which the disk drive unit is not loaded with the floppy disk 200. If the floppy disk 200 is inserted, each engaging portion 20a of the slider 20 moves forward (downward in FIG. 28A) with respect to each engaging plate portion 32a of the frame 30.

In this manner, the front and rear portions of the slider 20 can be securely held on the frame 30 through the engagement between the engaging plate portion 32a and the engaging portion 20a and the engagement between the engaging projection 25 and the support slit 35, respectively.

If the slider 20 is moved to the second moved position which is further pressed backward from the first moved position, that is, if the slider 20 in the position shown in FIG. 28A is moved further upward in the same drawing, the engaging projection 25 is situated in the aperture 35a of the support slit 35 (FIG. 26C), as mentioned before, and the engaging plate portion 32a of the frame 30 and the engaging portion 20a of the slider are disengaged from each other. Thus, the slider 20 can be taken out upward from the frame 30.

The engaging plate portion 32a of the frame 30 is formed having a tapped hole 32b in the center. The tapped hole 32b can receive one of screws 40a (FIG. 6) for attaching the cover 40 to the upper surface of the frame 30.

As described above, the slider 20 can be taken out of the frame 30 if the slider 20 is moved to the second moved position which is further pressed backward from the first moved position. In normal use, however, the slider 20 must be prevented from being pressed too hard and disengaged from the frame 30.

Figure 29:
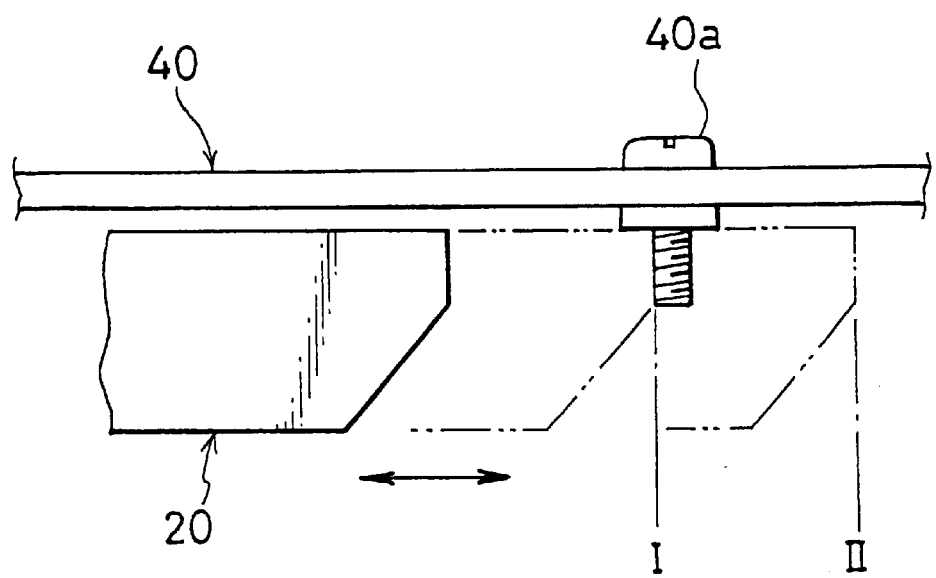
FIG. 29 is a view illustrating an example of the way of regulating the movement of the slider by utilizing a screw for attaching the cover to the frame.

As shown in FIG. 29, therefore, one of the screws 40a (FIG. 6) for attaching the cover 40 to the frame 30 is utilized as movement regulating means. Since the cover 40 is being attached to the frame 30 when the disk drive unit is in normal use, the lower part of the cover mounting screw 40a projects from the lower surface of the cover 40. Therefore, the slider 20 cannot move to the second moved position (I) beyond the first moved position (I). If the cover 40 is removed for maintenance, however, the slider 20 cannot be hindered by the screw 40a, so that it can move to the second moved position (II) beyond the first moved position (I).

According to the arrangement described above, the screw 40a for attaching the cover 40 to the frame 30 is used to prohibit the slider 20 from moving to the second moved position (11) beyond the first moved position (1) when the disk drive unit is in normal use. The following is a description of alternative means that replaces the utilization of the screw 40a.

As shown in FIGS. 1 and 30A, the front end edge of the cover 40 is formed having a notched recess 40b, which can receive the eject button 27 which is attached to the front frame 21 of the slider 20. FIG. 30A shows a state in which the slider 20 (and the eject button 27) is moved forward (in the direction opposite to the direction indicated by arrow F of FIG. 30A) as the floppy disk 200 is inserted into the disk drive unit. At this point of time, the rear end of the eject button 27 is situated in a position III.

If the eject button 27 is then pushed in backward (in the direction opposite to the direction indicated by arrow F of FIG. 30A) in order to take out the floppy disk 200, the rear end of the eject button 27 moves to a position I, as shown in FIG. 30B. If the eject button 27 in this position is pushed further backward, the rear end 27a of the eject button 27 runs against a bottom edge 40b1 of the notched recess 40b and is prevented from moving further backward. Thus, if the slider 20 is pushed, it cannot be moved to the a position II (FIG. 30C) where it can be removed from the frame 30.

If the cover 40 is removed from the frame 30 for the maintenance of the disk drive unit, however, the bottom edge 40b1 of the notched recess 40b that prevents the backward movement of the eject button 27 ceases to exist, so that the rear end of the eject button 27 can be moved to the position II by pushing the slider 20.

As shown in FIGS. 30A and 30B, a recess 40g is formed by drawing in a region of the cover 40 that faces the bottom edge 40b1 of the notched recess 40b, and serves to restrain the cover 40 from being deformed when the eject button 27 abuts against the bottom edge 40b1 of the notched recess 40b.

Figure 31A:
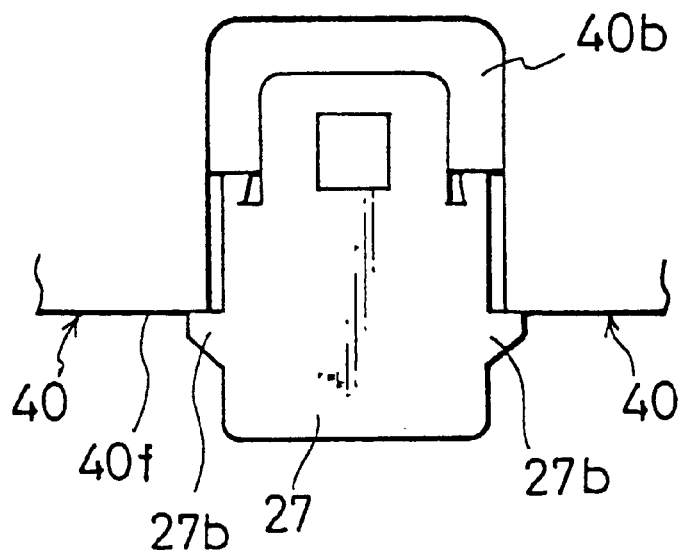
FIGS. 31A and 31B are views individually illustrating second and third examples of the way of regulating the movement of the slider by the eject button of the slider and the notched recess formed in the cover.
Figure 31B:
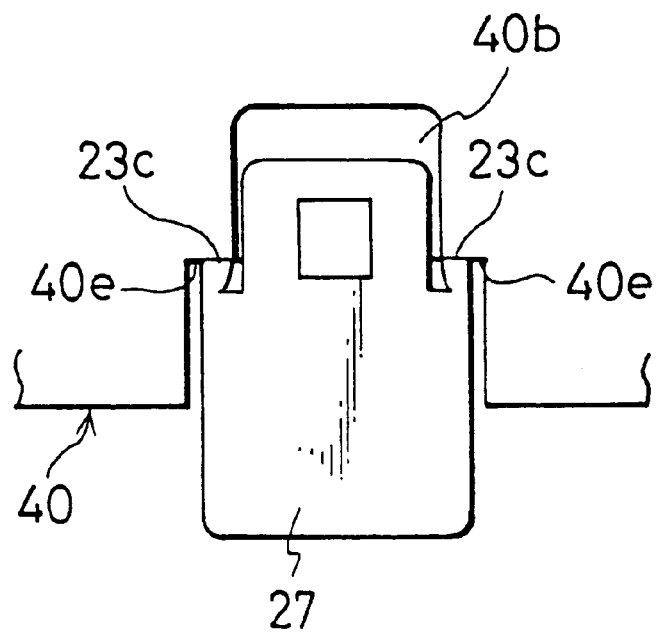

According to the arrangement described above, the backward movement of the slider beyond the position I is prevented by interference between the rear edge 27a of the eject button 27 and the bottom edge 40b1 of the notched recess 40b. Alternatively, as shown in FIG. 31A, projections 27b may be formed projecting sideways from the left- and right-hand side edges of the eject button 27, individually, so as to interfere with a front end edge 40f of the cover 40. As shown in FIG. 31B, moreover, the notched recess 40b of the cover 40 may be provided with step portions 40e so that the step portion 40e can be caused to interfere with a flange portion 27c of the eject button 27.

[Structure for Sliding Slider]

Figure 32:
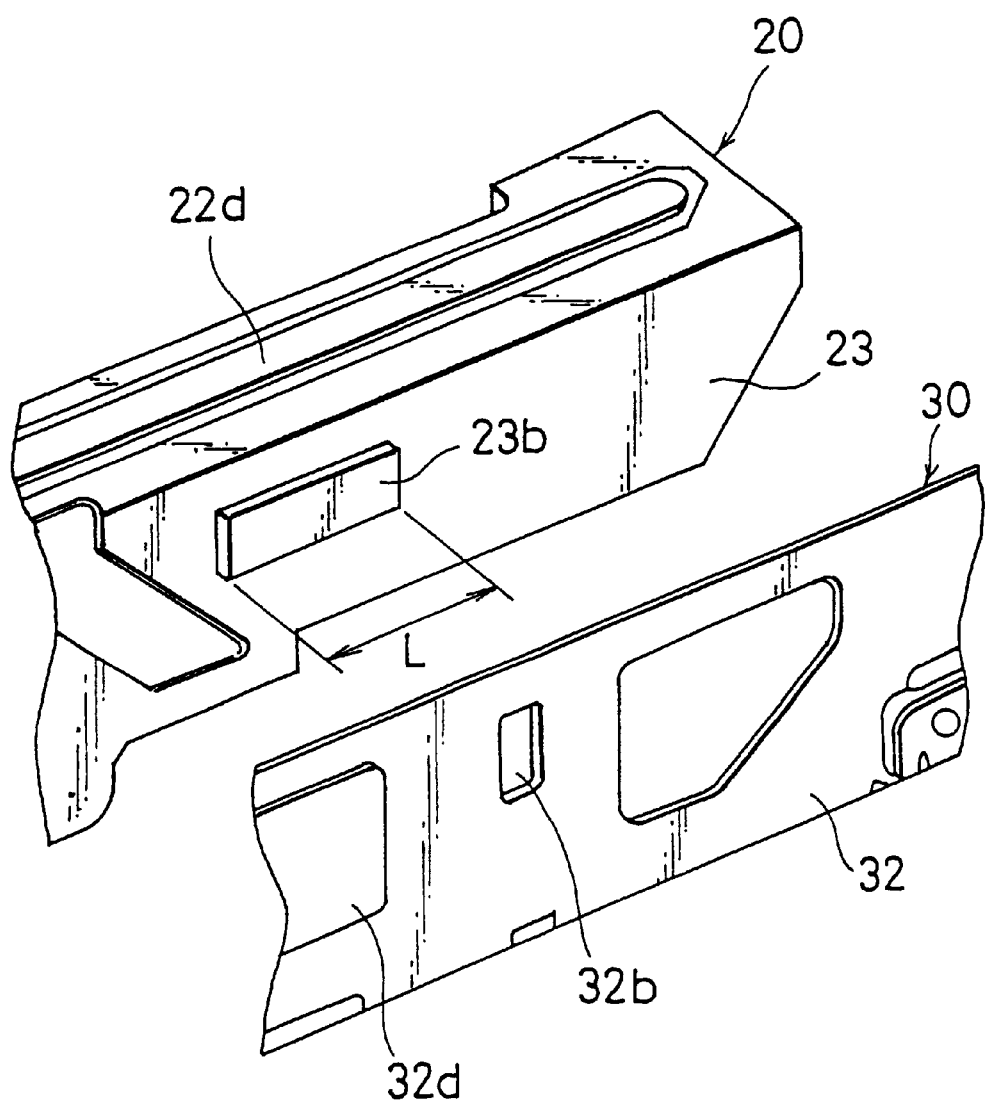
FIG. 32 is a perspective view showing projections formed individually on the slider and the frame, whereby the motion of the slider with respect to the frame is smoothed.

As shown in FIG. 32, the left- and right-hand side walls 32 of the frame 30 are formed individually with slide guide projections 32b that project individually inward from regions near their front and rear end portions, individually. On the other hand, the left- and right-hand side walls 23 of the slider 20 are formed individually with sliding projections 23b that project individually outward (or toward the frame 30) from regions that face the slide guide projections 32b of the frame 30.

In consequence, the sliding projections 23b of the side walls 23 of the slider 20 slide in contact with the slide guide projections 32b of the left- and right-hand side walls 32 as the slider 20 moves relatively to the frame 30 (see FIG. 33). Since the areas of contact between the sliding projections 23b and the slide guide projections 32b are small, frictional resistance is reduced, so that the slider 20 can be smoothly moved with respect to the frame 30.

The length, L, of the sliding projections 23b of the side walls 23 of the slider 20 is a length which allows the sliding projections 23b to keep in contact with the slide guide projections 32b of the slider 20 throughout the movement range of the slider 20 when the slider 20 moves relatively to the frame 30.

The sliding projections 23b and the slide guide projections 32b are formed by effecting working (half-cutting) in a manner such that a plate material that constitutes the slider 20 or the frame 30 is cut for half its thickness and then the worked portion is projected on one surface side to create a difference in level.

As shown in FIGS. 3 and 32, moreover, the upper surface of each of the left- and right-hand side frames 22 of the slider 20 is formed with a ridge 22d that extends in its lengthwise direction. Therefore, the area of contact between the slider 20 and the inside of the top plate 40h of the cover 40 is reduced, so that friction between them is lessened. Thus, the slider 20 can be smoothly slid with respect to the cover 40. The ridge 22d serves also as a reinforcing rib for each side frame 22.

[Structure for Attaching Cover to Frame]

As shown in FIG. 6, the cover 40 is designed so that the left- and right-hand side edges of the top plate 40h are bent to form side walls 40c and that an engaging hole 40d is formed in each of the side walls 40c. On the other hand, an outwardly projecting engaging projection 32d is formed on each of the left- and right-hand side walls 32 of the frame 30, corresponding in position to each engaging hole 40d of the cover 40. The cover 40 can be positioned as the engaging holes 40d of the cover 40 engage the engaging projections 32d of the frame 30, and screw passage holes 40m formed in the cover 40 correspond individually to the tapped holes 30a that are formed in the frame 30.

As mentioned before, the engaging projections 13 of the carrier are in engagement with the slanting guide holes 24 of the slider 20, individually. The respective distal ends of the engaging projections 13 project outward for short distances from the side walls 23 of the slider 20. If a combination of the carrier 10 and the slider 20 is incorporated into the frame 30, therefore, the respective distal ends of the engaging projections 13 of the carrier 10 interfere with the respective inner surfaces of the left- and right-hand side walls 32, individually.

Figure 34:
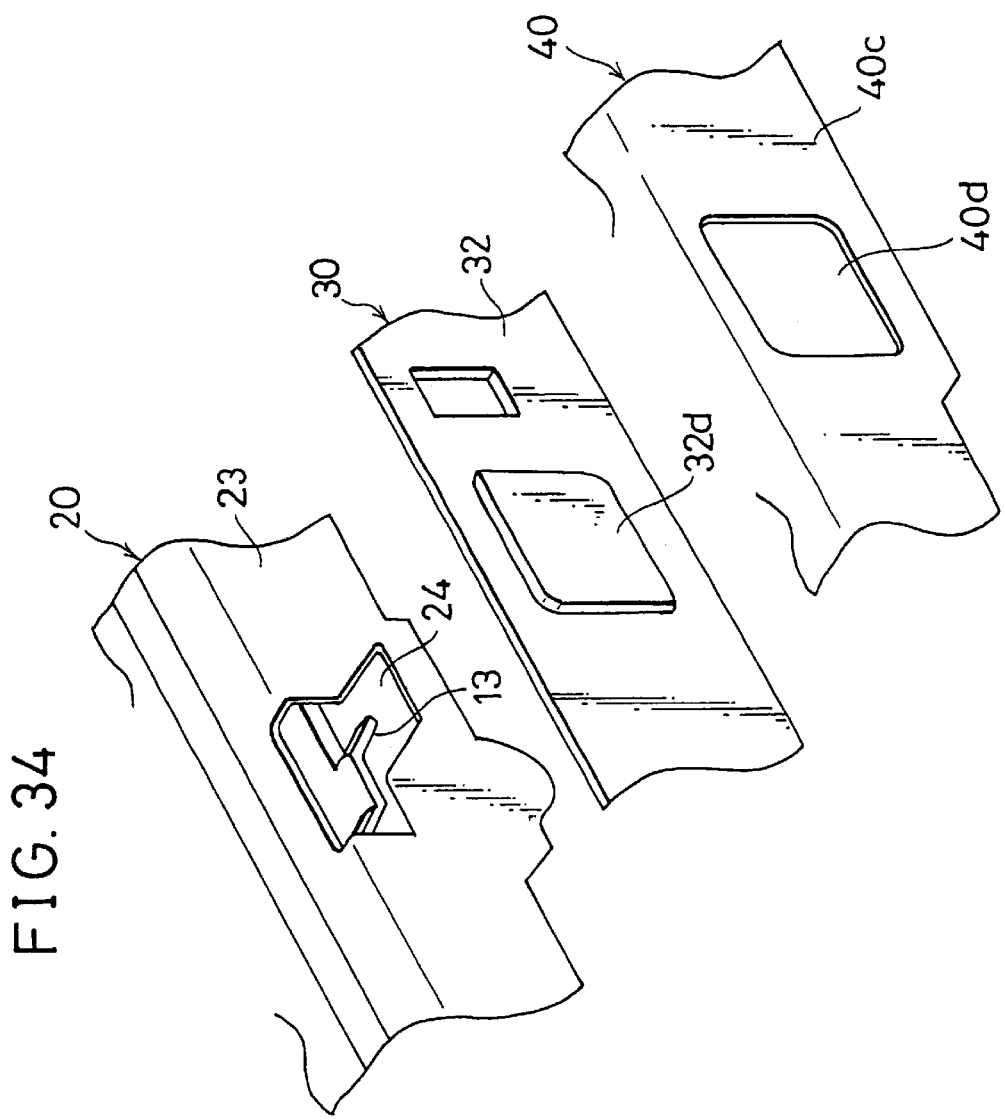
FIG. 34 is a view illustrating the way the projecting side of the engaging projection on the frame engages an engaging hole of the cover while the back recess side of the engaging projection receives the distal end of an engaging projection projecting from the carrier.
Figure 35:
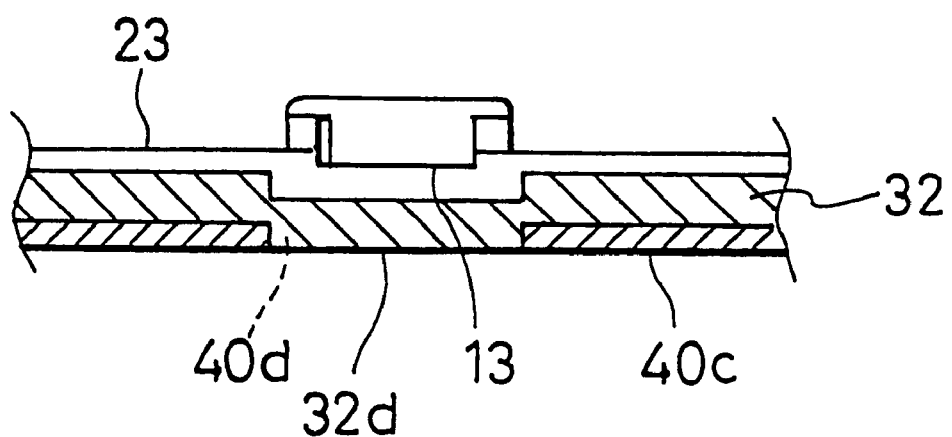
FIG. 35 is a sectional view showing a state in which the distal end of the engaging projection projecting from the carrier is situated in the back recess of the engaging projection of the frame.

To avoid this, therefore, the distal end of each engaging projection 13 of the carrier 10 is opposed to a recess in the back of each engaging projection 32d which is formed on each side wall 32 of the frame 30 by half-cutting, as shown in FIG. 34. Thus, as shown in FIG. 35, the distal end of each engaging projection 13 is received by a depression in the back of the engaging projection 32d of each side wall 32 by selecting the respective positions of the engaging hole 40d of each cover side wall 40c and the engaging projection 32d of each frame side wall 32, which are formed to position the cover 40, so that they correspond to each engaging projection 13 of the carrier 10. As this is done, the distal end of each engaging projection 13 of the carrier 10 can be prevented from interfering with the inner surface of each side wall 32 of the frame 30.

[Floppy Disk Insertion Guide Portion]

As shown in FIG. 4, disk insertion guides 30f are formed individually on the respective front end portions of the left- and right-hand side walls 32 of the frame 30 so as to project inward. The disk insertion guides 30f serve as guides when the floppy disk 200 is inserted through the loading slot 36a of the disk drive unit (and when the engaging piece 53 is pulled by the coil spring 52 so that the floppy disk 200 is taken out through the loading slot 36a).

Figure 36:
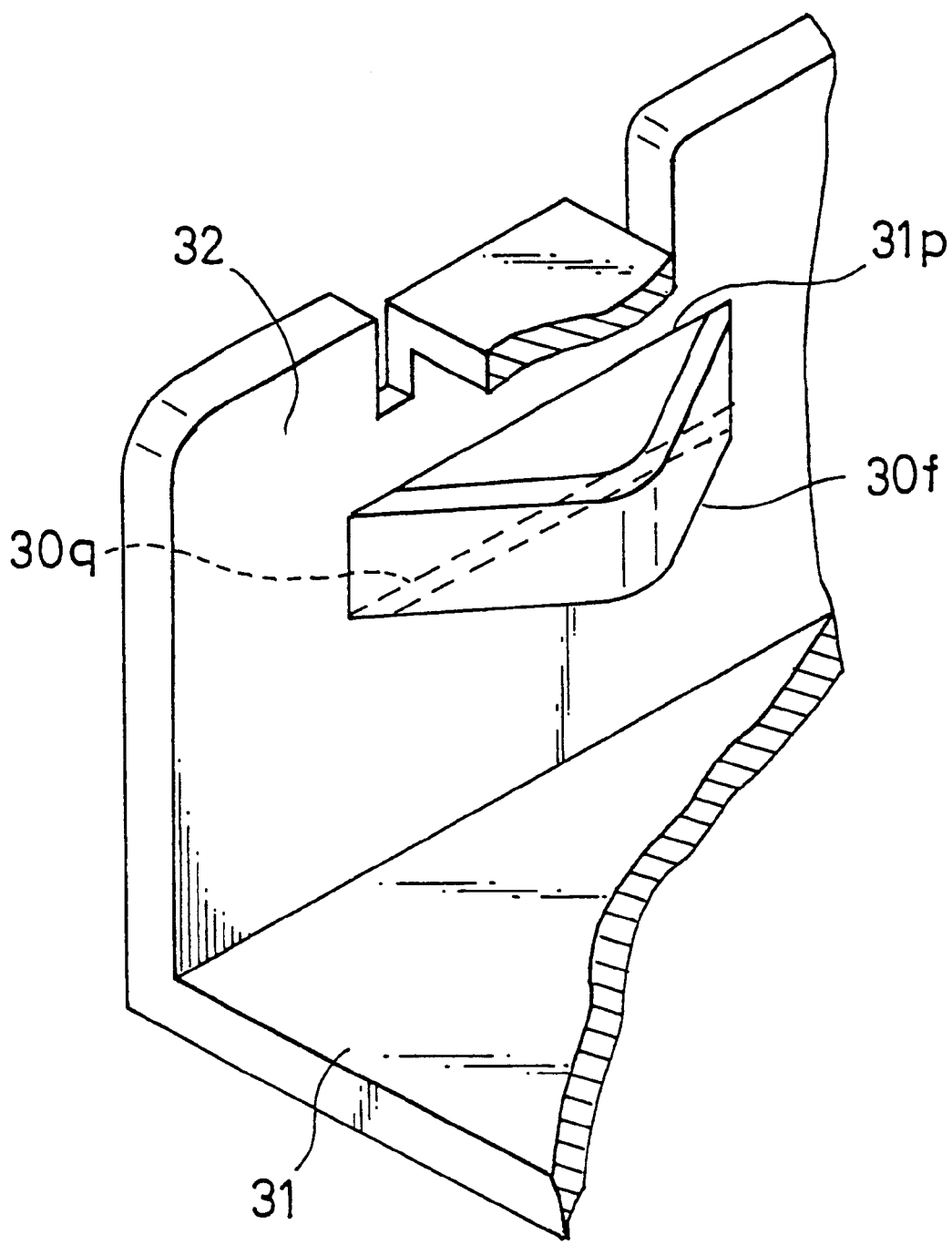
FIG. 36 is an enlarged view of a disk insertion guide formed on the front end portion of a side wall of the frame shown in FIG. 4.
Figure 37A:
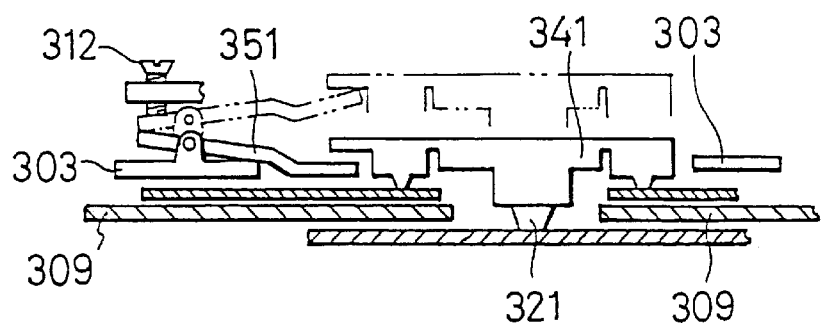
FIGS. 37A and 37B are a sectional view and a front view, respectively, showing an example of a prior art magnetic head lift mechanism.
Figure 37B:
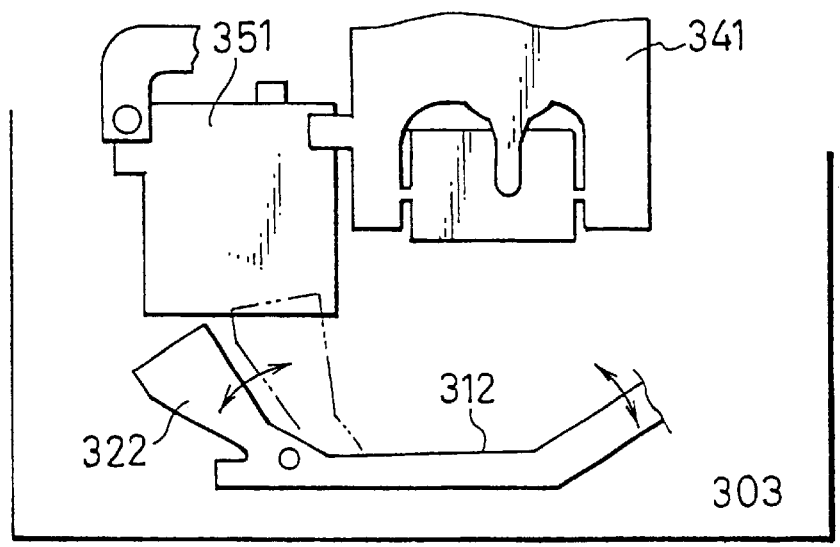
Figure 38A:
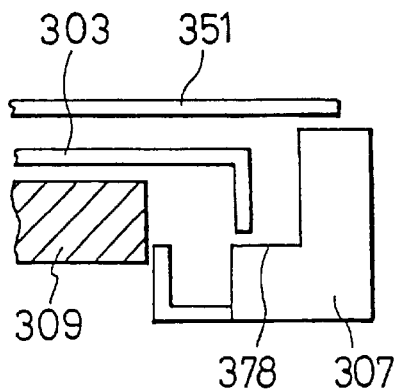
FIGS. 38A and 38B are views showing lifter descent preventing means as an alternative to lifter descent preventing means used in the magnetic head lift mechanism of FIGS. 37A and 37B.
Figure 38B:
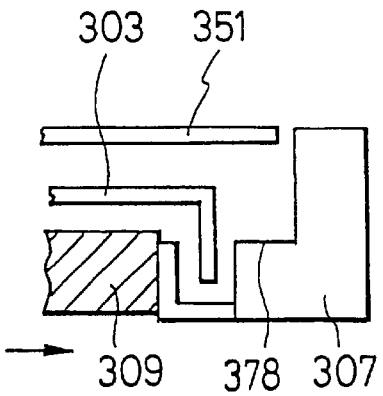

As shown in detail in FIG. 36, each disk insertion guide 30f is obtained by cutting in the front end portion of each side wall 32 of the frame 30 two slits 31p and 31q with a given length that extend parallel to the base plate 31 and projecting a portion between the slits 31p and 31q inward to form a V-shaped projection.

What is claimed is:

1. A disk driver unit, comprising:

an upper head;

an upper head support member which supports the upper head;

a carrier which carries a disk cartridge and can rise and fall between a disk drive position and a disk attaching/detaching position;

a slider which engages the carrier and slides between a first position and a second position so as to cause the carrier to move between the disk drive position and the disk attaching/detaching position; and a lift mechanism which has a slide piece and a link member and moves the upper head up to a recession position apart from the disk cartridge; wherein the link member is supported on and rotatable around a pivot provided on the carrier so that the link member rises and falls as the carrier rises and falls, one end of the link member is engaged with the slider and the other end of the link member is provided with the slide piece so that the link member rotates around the pivot as the slider moves to cause the slide piece to slip into and out of the space between the upper head and the carrier, and the upper head rises and falls further by means of the slide piece which slips into and out of the space between the upper head on the carrier by the link member which rotates around the pivot with the movement of the slider, in addition to the rise and fall movement of the carrier.

2. The disk drive unit according to claim 1, wherein the upper head support member is attached in a form of a cantilever through a leaf spring to a pedestal fixed in the disk drive unit, first and second leg portions extend from an end portion of the upper head support member connected to the leaf spring to positions on the left- and right-hand sides of the leaf spring, the first and second leg portions being formed with projections in contact with the pedestal on the lower surfaces of the respective distal ends thereof, a projecting piece to engage the slide piece is formed projecting from a side edge of the upper head support member on the side where the slide piece exists, and the shape of the projection of the second leg portion on the side opposite the side where the projecting piece is formed is made partly different from that of the projection of the first leg portion so that that part of the projection of the second leg portion which is in contact with the pedestal gradually moves away from the projecting piece when the slide piece engages the projecting piece of the upper head support member to lift up the upper head support member.

3. The disk drive unit according to claim 2, wherein the projection of said first leg portion has a semicylindrical cross section such that the projection is in linear contact with the pedestal, and a part of the projection of said second leg portion on the front side thereof or on the proximal side of the second leg portion has a cross section of the same shape as that of a front-side part of the projection of the first leg portion, the remaining part having a flat lower surface and backwardly extending longer than a free end of the first leg portion.

4. The disk drive unit according to claim 2, wherein said pedestal is provided with a member covering the respective rear end portions of the first and second leg portions and preventing the first and second leg portions from excessively lifting up.

5. The disk drive unit according to claim 1, wherein the slider has a flute which extends in a vertical direction, and which the link member engages.

6. The disk drive unit according to claim 5, wherein the lift mechanism has a slide piece which slides in a direction perpendicular to the sliding direction of the slider, and one end of the link member engages the slide piece while the other end of the link member engages the slider.

7. The disk drive unit according to claim 6, wherein a guide portion in a form of a straight line is formed on the carrier for guiding the movement of the slide piece.

* * * * *